United States Patent
Balliett et al.

(10) Patent No.: US 12,160,148 B2
(45) Date of Patent: Dec. 3, 2024

(54) MOTOR STATOR WITH SEMI-STAGGERED WINDING LAYOUT UTILIZING COMPLEX TWISTING

(71) Applicant: Rivian IP Holdings, LLC, Plymouth, MI (US)

(72) Inventors: Logan Noel Balliett, Los Angeles, CA (US); Dang Dinh Dang, Garden Grove, CA (US); Khwaja Rahman, Troy, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 371 days.

(21) Appl. No.: 17/680,896

(22) Filed: Feb. 25, 2022

(65) Prior Publication Data
US 2023/0275482 A1 Aug. 31, 2023

(51) Int. Cl.
*H02K 3/28* (2006.01)
*B60K 1/02* (2006.01)

(52) U.S. Cl.
CPC . *H02K 3/28* (2013.01); *B60K 1/02* (2013.01)

(58) Field of Classification Search
CPC ........................................................ H02K 3/28
See application file for complete search history.

(56) References Cited

U.S. PATENT DOCUMENTS

| | | | | |
|---|---|---|---|---|
| 9,520,753 | B2* | 12/2016 | Rahman | H02K 3/28 |
| 11,056,943 | B2* | 7/2021 | Rahman | H02K 3/14 |
| 11,056,954 | B2* | 7/2021 | Liang | H02K 1/16 |
| 11,296,565 | B2* | 4/2022 | Herzberger | H02K 3/12 |
| 11,368,066 | B2* | 6/2022 | Ahmed | H02K 3/12 |
| 11,539,255 | B2* | 12/2022 | Ahmed | H02K 3/14 |
| 11,722,028 | B2* | 8/2023 | Shi | H02K 3/28 310/208 |
| 11,923,741 | B2* | 3/2024 | Dang | H02K 3/28 |
| 11,949,305 | B2* | 4/2024 | Ahmed | H02K 3/28 |
| 2015/0028713 | A1* | 1/2015 | Rahman | H02K 3/28 310/198 |
| 2016/0285334 | A1 | 1/2016 | Turnbull et al. | |
| 2020/0067362 | A1 | 2/2020 | Shiah et al. | |
| 2020/0227985 | A1 | 7/2020 | Dotzel et al. | |
| 2020/0381969 | A1 | 12/2020 | Ahmed et al. | |

(Continued)

OTHER PUBLICATIONS

Combined Search and Examination Report issued in corresponding United Kingdom Patent Application No. GB2215973.5.

(Continued)

*Primary Examiner* — Robert W Horn
(74) *Attorney, Agent, or Firm* — Foley & Lardner LLP

(57) ABSTRACT

A motor stator for a motor is disclosed. The motor stator includes a stator body and a plurality of windings. The stator body includes a weld end, a crown end, and a plurality of slots arranged circumferentially and extending axially therethrough between the weld end and the crown end, the slots including a plurality of layers arranged in a radial direction with layers being organized in conductor pairs. Each winding includes a plurality of coils and a plurality of weld pairs. Each weld pair includes legs of two respective coils joined together to form an electrical connection between the two respective coils. The plurality of weld pairs includes one or more jumper weld pairs arranged to jump the respective winding between two respective conductor pairs.

20 Claims, 24 Drawing Sheets

(56) References Cited

U.S. PATENT DOCUMENTS

| | | | | |
|---|---|---|---|---|
| 2021/0218305 A1* | 7/2021 | Tang | .................. | H02K 3/28 |
| 2022/0286006 A1* | 9/2022 | Ishikawa | .................. | H02K 3/28 |
| 2022/0311299 A1* | 9/2022 | Uetani | .................. | H02K 3/28 |
| 2022/0320934 A1* | 10/2022 | Shi | .................. | H02K 3/28 |
| 2022/0329124 A1* | 10/2022 | Domingues | .................. | H02K 15/0407 |
| 2022/0393535 A1* | 12/2022 | Ishikawa | .................. | H02K 3/28 |
| 2023/0179053 A1* | 6/2023 | Martinovic | .................. | H02K 15/0081 |
| | | | | 310/208 |
| 2023/0275482 A1* | 8/2023 | Balliett | .................. | H02K 3/28 |
| | | | | 310/208 |

OTHER PUBLICATIONS

Canadian Office Action on CA Appl. No. 3177294 dated Mar. 4, 2024.

Office Action issued in corresponding JPO Patent Application No. 2022176084.

* cited by examiner

MOTOR STATOR WITH SEMI-STAGGERED WINDING LAYOUT UTILIZING COMPLEX TWISTING

INTRODUCTION

The present disclosure generally relates to electric motors. More particularly, the present disclosure relates to a motor stator of an electric motor that includes complex twisting of weld pairs within the windings.

Motor stators include multiple windings therein which require a significant number of welds, coil types, and the like for the formation thereof. Due to the significant amount of coil types and welds that need to be formed, the manufacturing process is time consuming. Further, each weld is a potential for resistive loss and a potential failure point for the windings.

The present introduction is provided as illustrative environmental context only and should not be construed as being limiting in any manner. The principles of the present disclosure may be applied in other environmental contexts equally.

SUMMARY

The present disclosure generally provides a semi-staggered winding layout where corresponding windings of a given phase are offset from one another by one slot. In some embodiments, each winding includes a same-layer lead coil at the end thereof that includes the phase lead, the same-layer lead coil extends the winding length at the end that includes the phase lead such that the phase lead terminates on a weld end of the motor stator/stator body. The neutral lead is also configured to terminate on a weld end of the motor stator/stator body. As such, all connections/welds of the stator motor are formed on the same (weld end) side of the motor stator, which simplifies the manufacturing process by eliminating the need to fixture coil welds on both sides of the stack and reducing epoxy application to a single step. Further, the semi-staggered winding layout with the same-layer lead coils eliminates weld connections and reduces the number of unique coil types as compared to other motor stator configurations, reducing potential for resistive losses at these weld points as well as eliminating these potential failure points.

In other embodiments, the semi-staggered winding layout includes at least one form of complex twisting chosen from reverse twisting of some of the weld pairs, uneven twist end spans of some of the weld pairs, forming jumper weld pairs that jump between conductor pairs, and forming same-layer jumper weld pairs to join the forward winding and reverse winding together. By utilizing the complex twisting disclosed herein, the total number of unique coil types can be minimized, such as to three unique coil types, all welds can be formed on the weld end, and overall spacing between different types of weld pairs can be optimized, which improve the manufacturability, efficiency, and durability of the motor stator.

In one illustrative embodiment, the present disclosure provides a motor stator for a motor. The motor stator includes a stator body and a plurality of windings. The stator body includes a weld end, a crown end, and a plurality of slots arranged circumferentially and extending axially therethrough between the weld end and the crown end, the slots including a plurality of layers arranged in a radial direction with layers being organized in conductor pairs. Each winding includes a plurality of coils and a plurality of weld pairs. Each weld pair includes legs of two respective coils joined together to form an electrical connection between the two respective coils. The plurality of weld pairs includes one or more jumper weld pairs arranged to jump the respective winding between two respective conductor pairs.

In another illustrative embodiment, the present disclosure provides an electric axle. The electric axle includes a motor and a drive member. The motor includes a motor rotor and the motor stator. The motor stator includes a stator body and a plurality of windings. The stator body includes a weld end, a crown end, and a plurality of slots arranged circumferentially and extending axially therethrough between the weld end and the crown end, the slots including a plurality of layers arranged in a radial direction with layers being organized in conductor pairs. Each winding includes a plurality of coils and a plurality of weld pairs. Each weld pair includes legs of two respective coils joined together to form an electrical connection between the two respective coils. The plurality of weld pairs includes one or more jumper weld pairs arranged to jump the respective winding between two respective conductor pairs.

In a further illustrative embodiment, the present disclosure provides a vehicle. The vehicle includes an electric axle, a drive member, and a wheel. The electric axle includes a motor. The motor includes a motor rotor and the motor stator. The motor stator includes a stator body and a plurality of windings. The stator body includes a weld end, a crown end, and a plurality of slots arranged circumferentially and extending axially therethrough between the weld end and the crown end, the slots including a plurality of layers arranged in a radial direction with layers being organized in conductor pairs. Each winding includes a plurality of coils and a plurality of weld pairs. Each weld pair includes legs of two respective coils joined together to form an electrical connection between the two respective coils. The plurality of weld pairs includes one or more jumper weld pairs arranged to jump the respective winding between two respective conductor pairs. The drive member is coupled to the motor rotor. The wheel is coupled to the drive member and is configured to be driven thereby.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure generally provides a semi-staggered winding layout where corresponding windings of a given phase are offset from one another by one slot. In some embodiments, winding includes a same-layer lead coil at the end thereof that includes the phase lead, the same-layer lead coil that extends the winding length at the end that includes the phase lead such that the phase lead terminates on a weld end of the motor stator/stator body. The neutral lead is also configured to terminate on a weld end of the motor stator/stator body. As such, all connections/welds of the stator motor are formed on the same (weld end) side of the motor stator, which simplifies the manufacturing process by eliminating the need to fixture coil welds on both sides of the stack and reducing epoxy application to a single step.

As will be described below in further detail, in various embodiments, each winding includes two winding segments connected in series by a same-layer jumper coil. The winding segments are semi-staggered (the legs are in the same layer and offset by one slot) and extend in opposing azimuthal/circumferential directions. One of the winding segments includes the phase lead and the same-layer lead coil that extends beyond the staggered layout. The combination of this semi-staggered winding layout with the same-layer lead coils eliminates weld connections and reduces the number of unique coil types as compared to other motor stator configurations, reducing potential for resistive losses at these weld points as well as eliminating these potential failure points.

As will also be described below, in other various embodiments, the semi-staggered winding layout includes at least one form of complex twisting chosen from: reverse twisting of some of the weld pairs where a twist of first and second legs of a weld pair is in a direction different from a twist in another weld pair; uneven twist end spans of some of the weld pairs where a twist forming a first span spanning from a first slot, with a first leg of the weld pair therein, to a weld position of the weld pair is different from a second span spanning from a second slot, with a second leg of the weld pair therein, to the weld position; forming jumper weld pairs that jump between conductor pairs; and forming same-layer jumper weld pairs to join the forward winding and reverse winding together. By utilizing the complex twisting disclosed herein, the total number of unique coil types can be minimized, such as to three unique coil types, all welds can be formed on the weld end, and overall spacing between different types of weld pairs can be optimized, which improve the manufacturability, efficiency, and durability of the motor stator.

Figure 1:
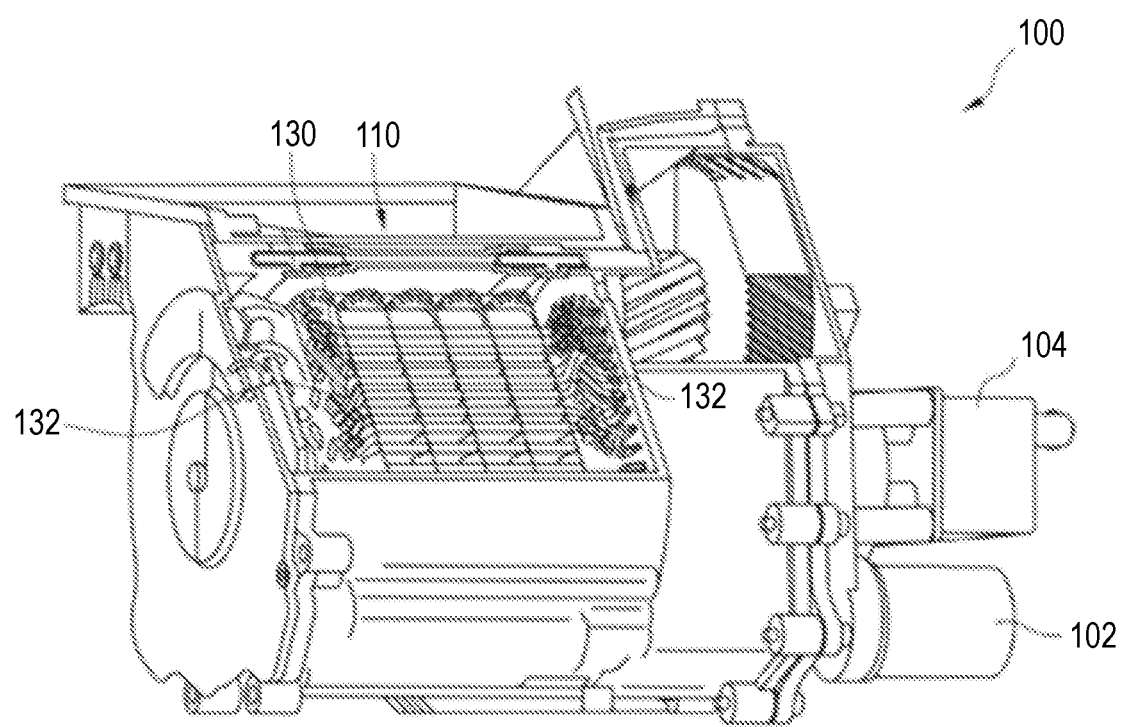
FIG. 1 is a is a perspective view of an electric axle in accordance with an embodiment of the present disclosure.
Figure 2:
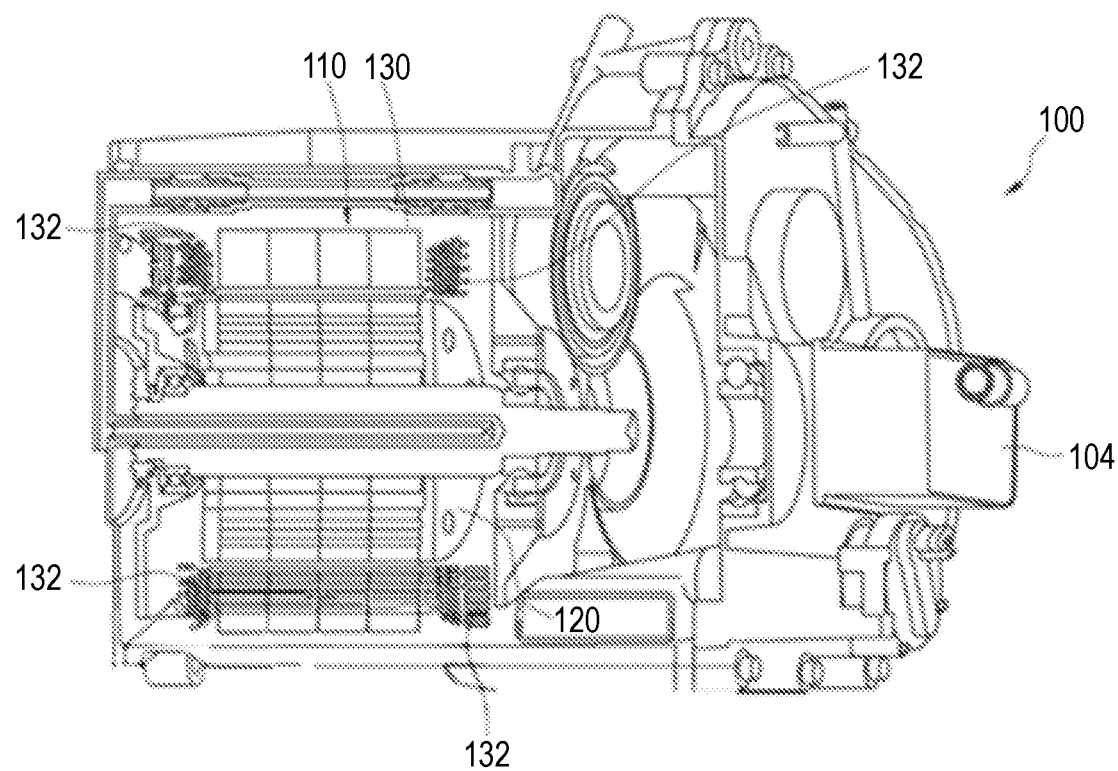
FIG. 2 is a perspective view in partial cut-away view of the electric axle of FIG. 1.

FIG. 1 is a is a perspective view of an electric axle 100. FIG. 2 is a perspective view in partial cut-away view of the electric axle of FIG. 1. Referring now to FIGS. 1-2, in various the electrical axle (e-axle) 100 is that of an electric motor for an electric vehicle. It will be appreciated that the example of the e-axle 100 for an electric vehicle is given by way of illustration only and not of limitation. It will also be appreciated that no such limitation of the e-axle 100 for an electric vehicle is intended and is not to be inferred.

The e-axle 100 includes a motor 110. It will be appreciated that the motor 110 may be any type of electrical motor as desired for a particular application. For example, in some embodiments the motor 110 may be an alternating current (AC) motor and in some other embodiments the motor 110 may be a direct current (DC) electrical motor. In embodiments in which the motor 110 is an AC motor, the motor 110 may be any type of AC motor as desired for a particular application, such as without limitation induction motors (also known as asynchronous motors) either single phase or polyphase and synchronous motors either reluctance or hysteresis. In embodiments in which the motor 110 is a DC motor, the motor 110 may be any type of DC motor as desired for a particular application, such as without limitation permanent magnet DC motors, series DC motors, shunt DC motors, and compound DC motors. In the interest of brevity, non-limiting, illustrative examples of an AC motor for the motor 110 are provided herein for purposes of illustration only and not of limitation. However, it is again emphasized that the motor 110 is not limited to an AC motor (of any type) and, in some embodiments, may be a DC motor.

The motor 110 includes a motor stator 130 and a motor rotor 120. The motor rotor 120 is adapted to rotate relative to the motor stator 130.

In various embodiments, the e-axle also includes an oil pump, an oil filter 102, and a heat exchanger 104. In various embodiments, the oil pump is fluidly coupled to an oil reservoir and adapted to draw oil out of the oil reservoir. The oil pump may be any type of suitable oil pump as desired for a particular application. The oil is pumped through the filter 102 and through the heat exchanger 104 before being delivered to the motor stator 130, such as to the windings 131 of the motor stator 130. In various embodiments, the oil filter 102 is configured to filter oil moving from the oil pump and to motor 110. The oil filter 102 may be any type of suitable oil filter as desired for a particular application.

In various embodiments, the heat exchanger 104 is adapted to receive heated oil from the oil pump and reject heat from the oil before supplying the oil back to the motor 110. The heat exchanger 104 may be any type of heat exchanger as desired for a particular application, such as without limitation a tube-and-shell heat exchanger, a cross-flow heat exchanger, a counter-flow heat exchanger, a plate heat exchanger, and the like.

Figure 3:
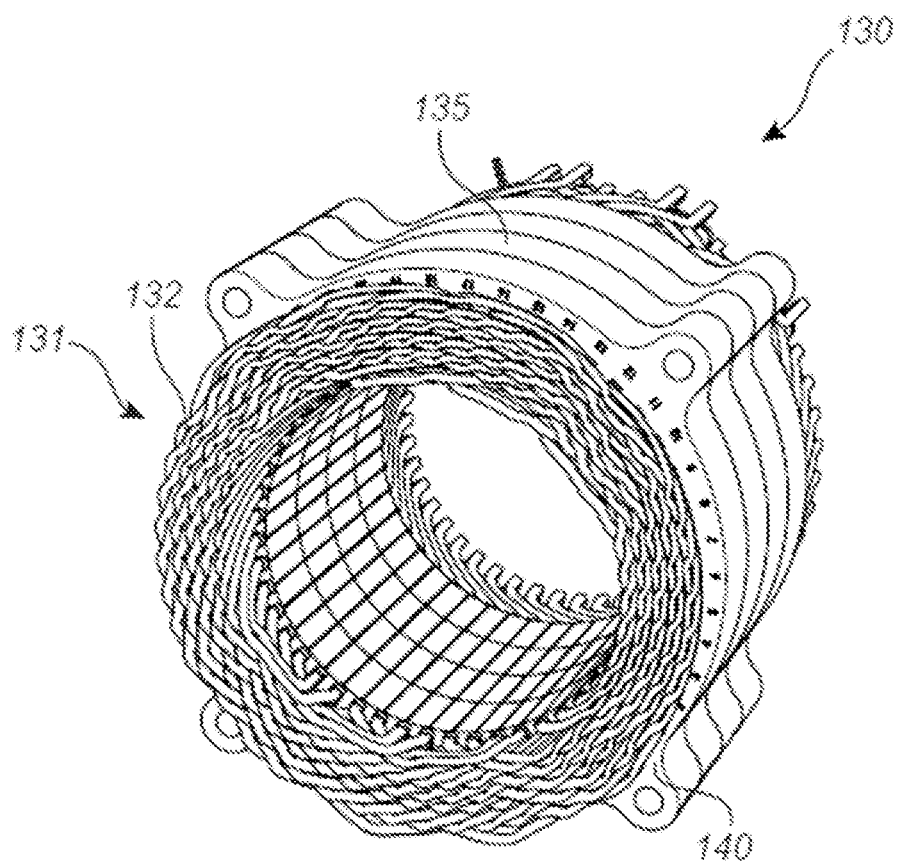
FIG. 3 is a perspective view of a crown end of a motor stator in accordance with an embodiment of the present disclosure.
Figure 4:
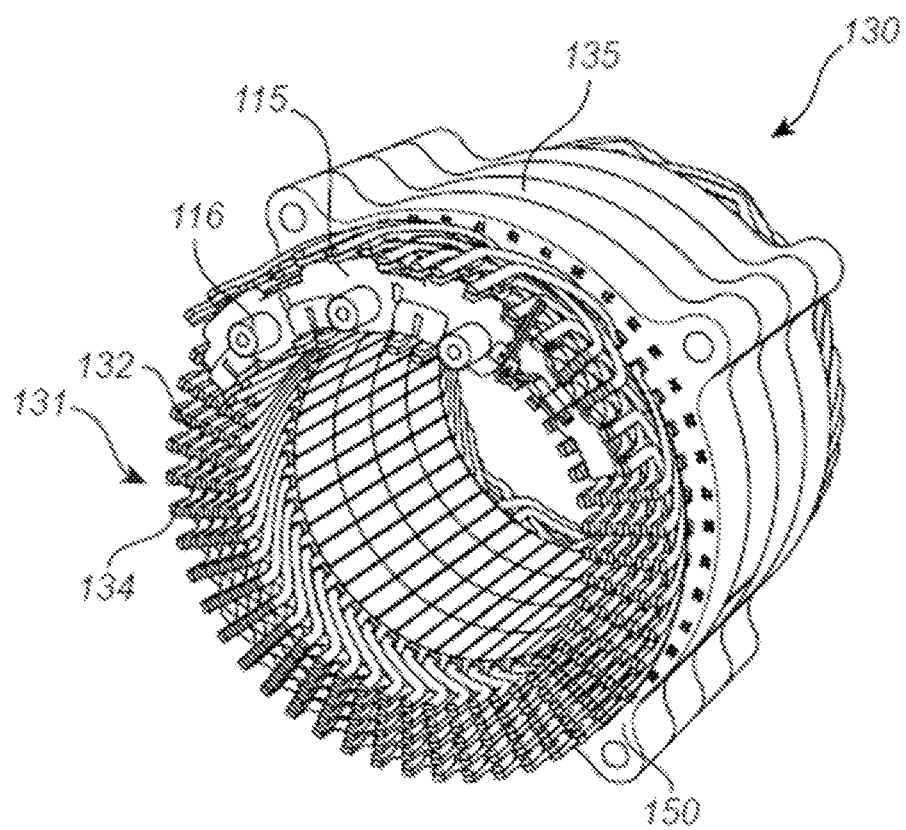
FIG. 4 is a perspective view of a weld end of a motor stator of FIG. 3.
Figure 5:
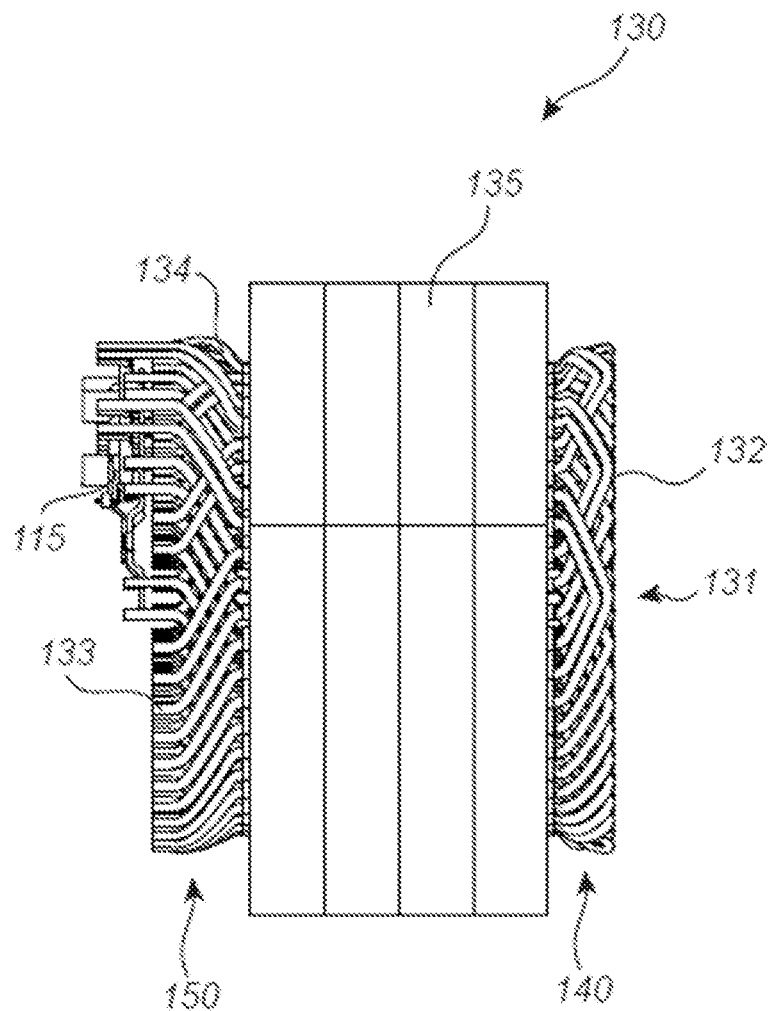
FIG. 5 is a side view of the motor stator of FIG. 3.

FIG. 3 is a perspective view of a crown end 140 of a motor stator 130 in accordance with an embodiment of the present disclosure. FIG. 4 is a perspective view of a weld end 150 of a motor stator 130 of FIG. 3. FIG. 5 is a side view of the motor stator 130 of FIG. 3. Referring to FIGS. 3-5, in various embodiments, the motor stator 130 includes a stator body 135, a weld end 150, a crown end 140, windings 131, and a busbar 115. In embodiments, the busbar includes terminals 116.

In various embodiments, the motor stator 130 includes a semi-staggered phase layout that includes same-layer lead coils in the windings 131 that result in all electrical pathways beginning and ending on the weld end 150 of the motor stator 130. As such, as can be seen in FIGS. 4 and 5, all welds of the motor stator 130, including welds 133 joining ends of coils together to form the windings 131 and welds to the busbar 115, and in particular, the electrical connections to the terminals 116, are formed on the weld end 150. As can be seen in FIG. 3, in the embodiment illustrated, the crown end 140 does not include any welds.

Figure 6:
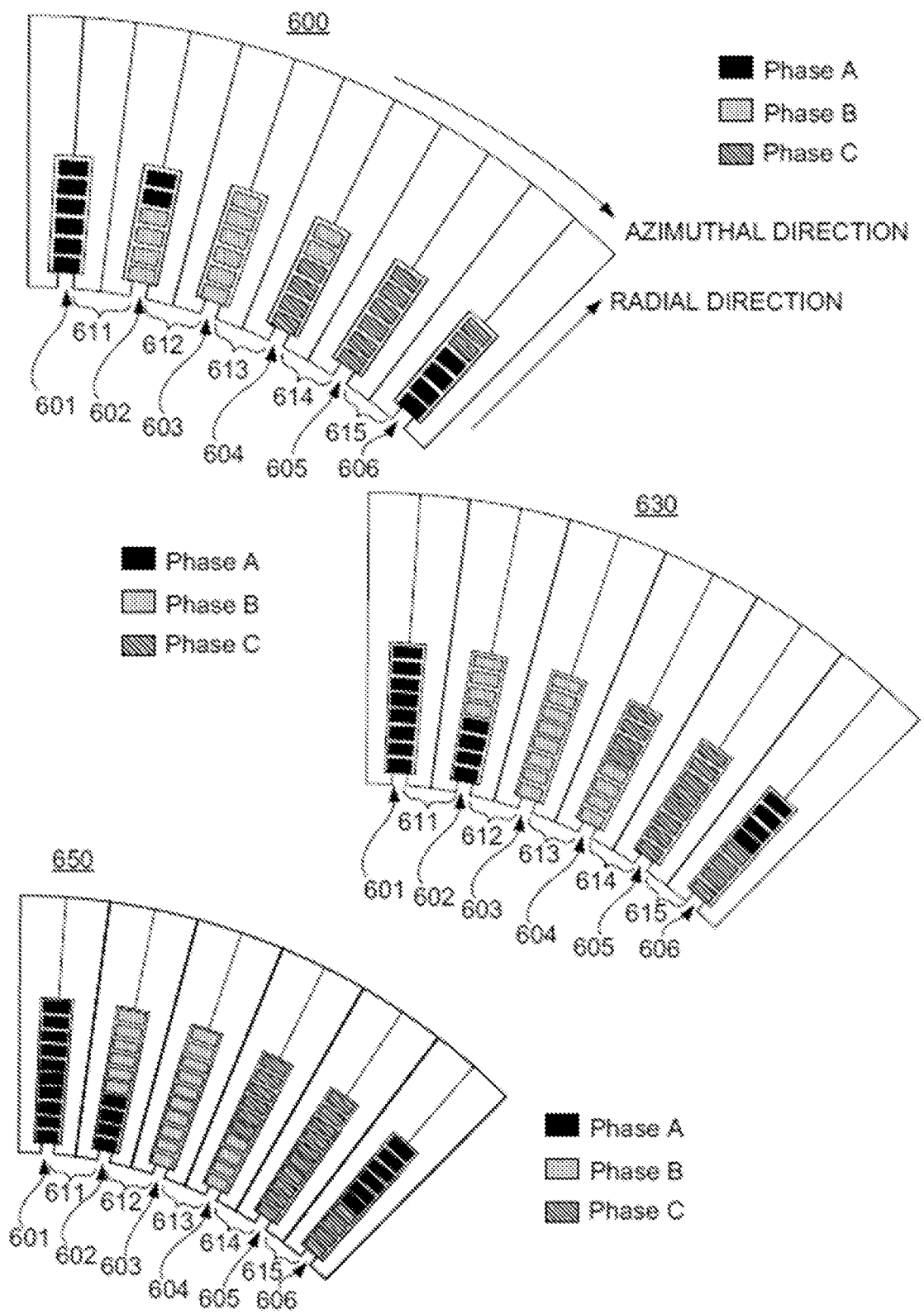
FIG. 6 is a schematic diagram of slot arrangements having different numbers of conductor layers, in accordance with some embodiments of the present disclosure.

In embodiments, the terminals 116 are configured to be coupled to respective phases (e.g., A, B, and C) of the motor 110 (e.g., three-phase, eight-pole as illustrated). The stator body 135 includes multiple slots (e.g., 48 circumferentially positioned slots arranged between a plurality of stator teeth, Refer to FIG. 6), each slot including multiple layers (refer to FIG. 6). The number of layers in a winding layout is defined by the number of conductors in each slot (e.g., stacked radially). In some arrangements, every conductor constitutes one layer. FIG. 6 illustrates embodiments with 6, 8, and 10 layers, the slots include ten layers, where the layers are positioned radially (FIG. 6 illustrates embodiments with 6, 8, and 10 layers respectively).

In various embodiments, each winding 131 includes multiple coils 132 welded together, with the welds 133 positioned and being formed on the weld end 150 of the motor stator 130. In embodiments, the coils 132 are wires, such as hairpins. Each coil 132 generally includes two legs 134, where the coil 132 is inserted from the crown end 140 and each leg of the coil 132 is inserted into one of the slots at one of the layers thereof and extends axially through the stator body 135 such that the lead end thereof extends from the stator body 135 at the weld end 150. Multiple coils 132 are arranged in the slots (e.g., meeting each other at welds 133). For example, a coil 132 may include two legs 134 configured to fit into two respective slots (i) at a radial position (e.g., the two legs configured to fit in a first layer and second layer, respectively, forming a layer pair such as 1-2, 3-4, 5-6, 7-8, 9-10), and (ii) across a predetermined pitch (e.g., number-of-slots width of the coil 132). As such, in various embodiments, with all of the coils 132 inserted with lead ends extending out of the weld end 150 of the stator body 135, all welds are formed on the weld end 150 including the connections to the busbar 115.

Illustrative windings B1, B2, B3, and B4 are shown in isolation for purposes of clarity in FIGS. 7-10, and an illustrative wiring schematic of some phases of motor stator 130 is shown in FIGS. 11-14 (e.g., for four semi-staggered windings B1, B2, B3, and B4). In some embodiments, the coils 132 include standard coils (e.g., coils 132 having a common shape) extending across a span and layer pair, and a same-layer winding jumper to connect forward windings with reverse direction windings. The coils 132 also include the same-layer lead coils.

The winding pitch (or "span") refers to the number of slots one leg 134 of a coil 132 is from the other leg 134 of the coil 132. For example, a coil 132 may extend a "full pitch," which is where the number of slots the coil 132 covers is equal to number of slots divided by number of poles (e.g., typically an integer for integral slot machines). The coil 132 may extend a "short pitch," often referred to as a "short," which is where the number of slots covered by the coil 132 is less than the full pitch. The coil 132 may also extend a "long pitch," often referred to as a "long," which is where the number of slots covered by the coil 132 is greater than the full pitch. Many winding arrangements, when connecting windings 131 in parallel, require coils 132 in every layer to make several pitches: standard pitch (full pitch); short pitch; and (sometimes) long pitch.

In various embodiments, the windings 131 include forward and reverse windings that may be connected in series. For example, the forward and reverse windings of the present disclosure may either occupy all the slots in a layer or partially occupy the slots in every layer (e.g., depending on the number of parallel connections, refer to FIG. 6). A forward winding can be connected (e.g., via a same-layer jumper) to a reverse winding, the forward and reverse windings complementing each other in a semi-staggered manner. The approach of the present disclosure utilizes standard shapes (e.g., full pitch coils) in layer pairs, thus reducing the number of different shapes in the winding layouts. For example, a same winding layout can apply to all of the forward winding, and after a same-layer jump, is connected to the reverse winding having a semi-staggered winding layout. The combination of the forward and the reverse windings can make the winding fully balanced, reducing the number of coil shapes. Further, as will be illustrated in further detail below, short and long same-layer lead coils are positioned at a phase lead end of the windings that ensure that the phase leads are on the weld end 150 of the motor stator 130.

FIG. 6 is a schematic diagram of slot arrangements having different numbers of conductor layers, in accordance with some embodiments of the present disclosure. In particular, FIG. 6 illustrates a portion of three end views (e.g., panels 600, 630, and 650) of illustrative slot arrangements of the motor stator 160 having different numbers of conductor layers, in accordance with some embodiments of the present disclosure.

Referring to panel 600, a slot arrangement with six conductor layers is illustrated (six conductors per slot). Referring to panel 630, a slot arrangement with eight conductor layers is illustrated (eight conductors per slot). Referring to panel 650, a slot arrangement with ten conductor layers is illustrated (ten conductors per slot). For reference, an azimuthal direction (e.g., the direction of slot indexing) and a radial direction (e.g., direction of layer indexing) are indicated in each of panels 600, 630, and 650. The azimuthal direction in the embodiments illustrated extends in a circumferential direction (such as in a clockwise direction while viewing the end of the motor stator 130 illustrated). In the embodiment illustrated, the layers of slots 601-605 are indexed in the radial outward direction. A coil 132 (of the windings 131 that has the same layer is thus a coil that passes through two different slots 601-606 while also passing at the same radially indexed position (or layer).

In each of panels 600, 630, and 650, several windings, such as windings 131 of FIGS. 3-5, are illustrated for three phases (e.g., with parts of phase A repeating, but with the opposite current flow orientation). As illustrated, each arrangement of panels 600, 630, and 650 includes slots 601-606, and stator teeth 611-615 arranged between adjacent slots. In each of panels 600, 630, and 650, several windings are illustrated for three phases (e.g., with parts of phase A repeating, but with the opposite current flow orientation). As illustrated in each of panels 600, 630, and 650, the windings for each phase are distributed between three of the slots shown, where slot is shared with other phases for two of the three slots. As illustrated, windings of Phase A of a first polarity (e.g., current into or out of the page, as illustrated) are included in slots 601 and 602, and windings of Phase A having an opposite polarity are included in slot 606. As illustrated, windings of Phase B of a first polarity are included in slots 602, 603, and 604. As illustrated, windings of Phase C of a first polarity are included in slots 604, 605, and 606. Staggering of the windings between three slots among the layers (e.g., the radial staggering of Phase A windings between slots 601, 602, and 606 in panel 600, and Phases B and C as well) can lower the fifth and the seventh order winding harmonics, resulting in lower torque ripple, which can be a source of motor noise. In some embodiments, not illustrated in FIG. 6, the winding of each phase may be distributed in two slots where there will be no sharing of phases within each of these slots. To illustrate, the latter may be preferred for manufacturing reasons but at the expense of higher spatial harmonics in the motor in some circumstances.

Figure 7:
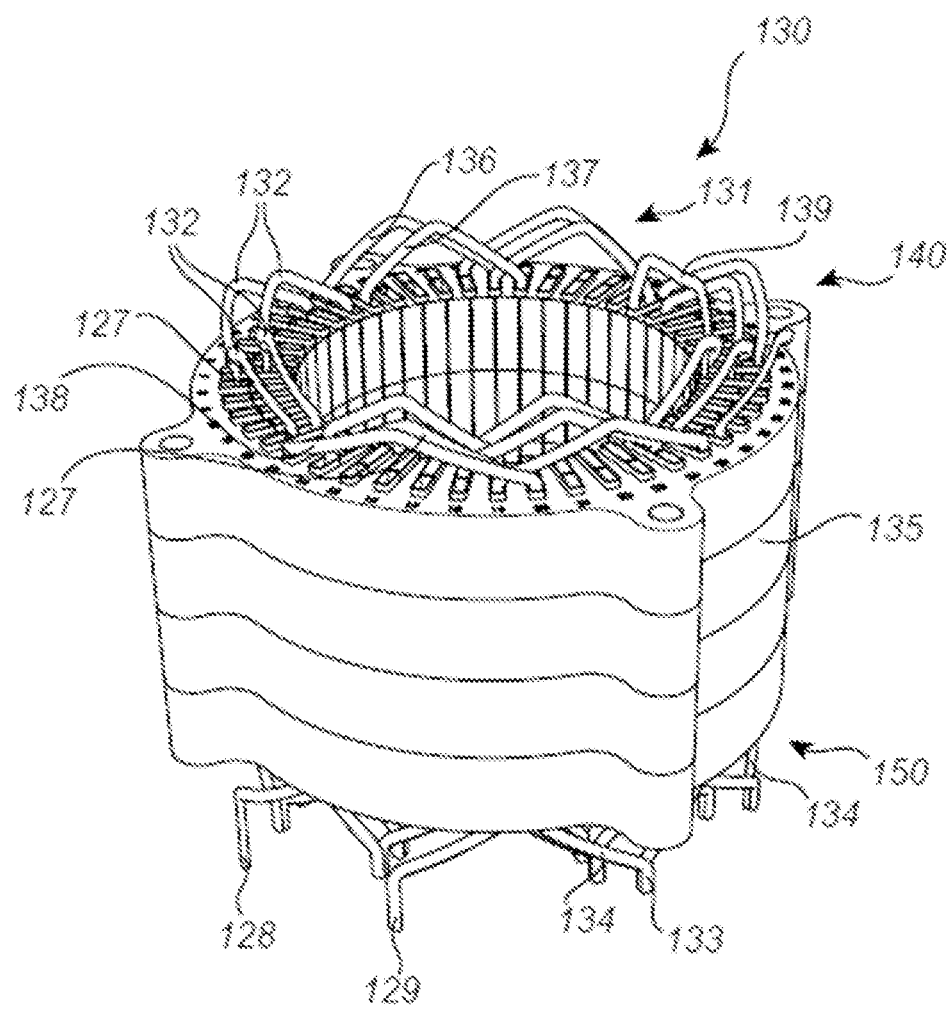
FIG. 7 is a perspective view of the motor stator highlighting a first phase winding thereof in accordance with an embodiment of the present disclosure.
Figure 8:
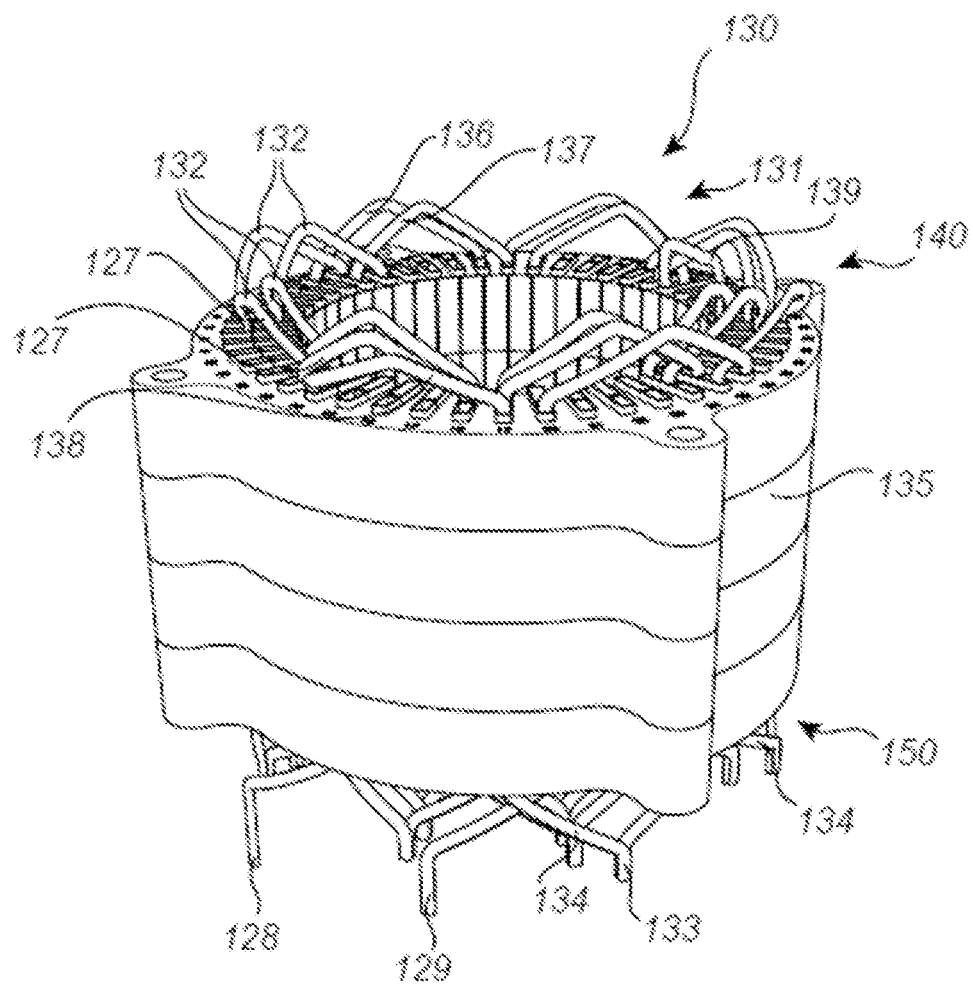
FIG. 8 is a perspective view of the motor stator highlighting a second phase winding thereof in accordance with an embodiment of the present disclosure.
Figure 9:
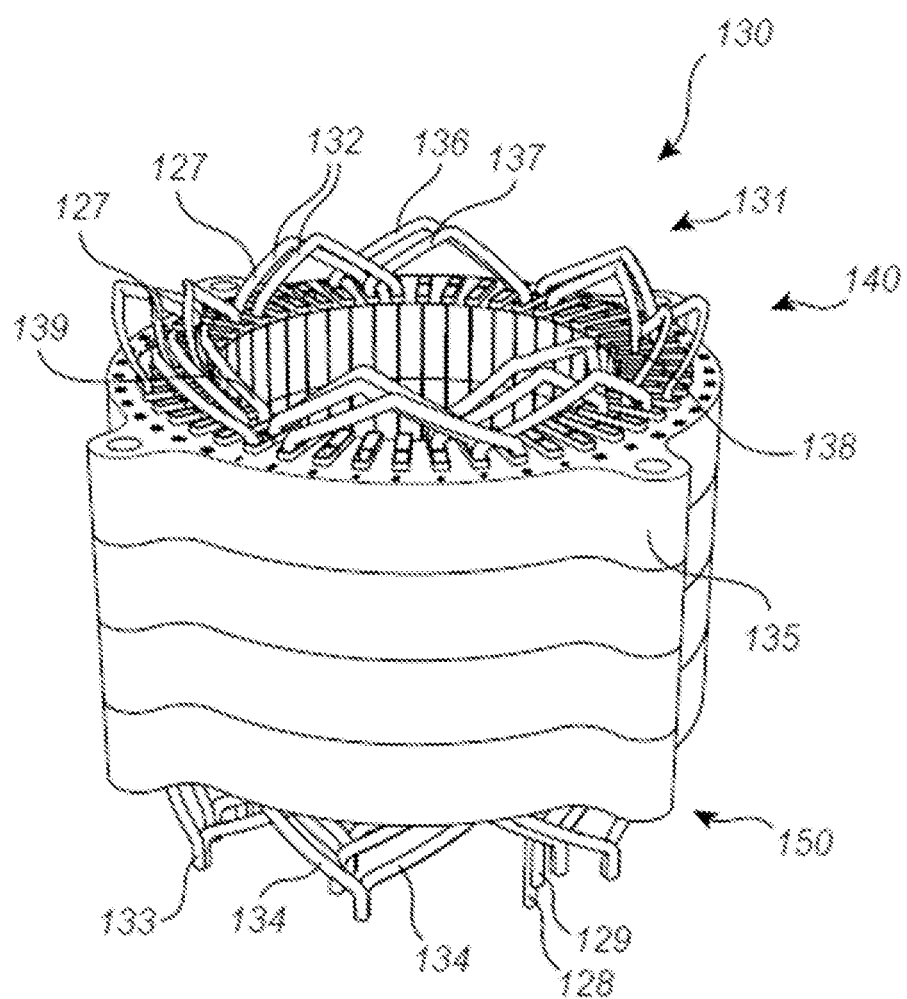
FIG. 9 is a perspective view of the motor stator highlighting a third phase winding thereof in accordance with an embodiment of the present disclosure.
Figure 10:
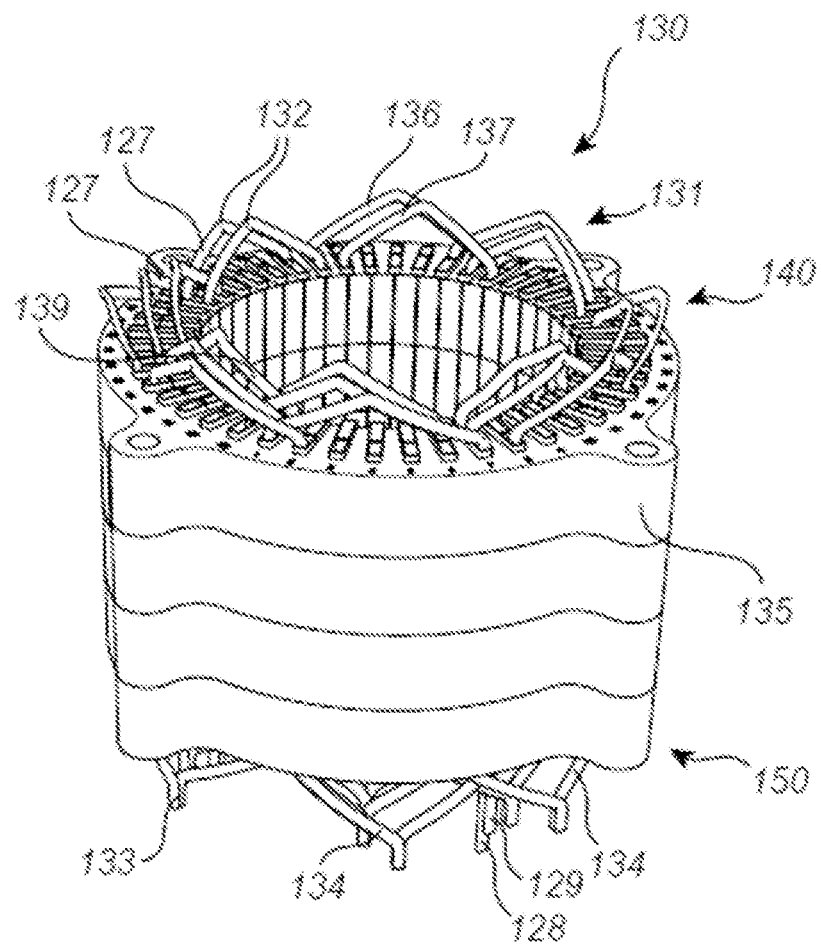
FIG. 10 is a perspective view of the motor stator highlighting a fourth phase winding thereof in accordance with an embodiment of the present disclosure.

FIG. 7 is a perspective view of the motor stator 130 highlighting a first phase winding 131 thereof in accordance with an embodiment of the present disclosure. FIG. 8 is a perspective view of the motor stator 130 highlighting a second phase winding 131 thereof in accordance with an embodiment of the present disclosure. FIG. 9 is a perspective view of the motor stator 130 highlighting a third phase winding 131 thereof in accordance with an embodiment of the present disclosure. FIG. 10 is a perspective view of the motor stator 130 highlighting a fourth phase winding 131 thereof in accordance with an embodiment of the present disclosure. Referring to FIGS. 7-10, windings (131) B1 (first phase winding, FIG. 7), B2 (second phase winding, FIG. 8), B3 (third phase winding, FIG. 9), and B4 (fourth phase winding, FIG. 10) of phase B are illustrated in isolation in FIGS. 7-10 respectively.

In various embodiments, each of the windings 131 includes a forward winding segment 136, a reverse winding segment 137, a same-layer jumper coil 139, a same-layer lead coil 138, a phase lead 128, and a neutral lead 129. The forward winding segment 136 is wound in a first azimuthal/circumferential direction and the reverse winding segment 137 is wound in a second azimuthal/circumferential direction, opposite the first azimuthal/circumferential direction. The forward winding segment 136 and reverse winding segment 137 are connected via a same-layer jumper coil 139. The same-layer jumper coil 139 can include a standard, long, and short pitch with each leg of the same-layer jumper coil 139 being slotted in a respective slot at a same layer thereof. Each of the forward winding segment 136 and the reverse winding segment 137 are formed of multiple coils 132 joined together, such as via welding, at the weld end 150.

In various embodiments, the forward winding segment 136 and the reverse winding segment 137 are semi-staggered, such that the legs of coils 132 for the reverse winding segment 137 are clocked one slot relative to the legs of corresponding coils 132 for the forward winding segment 136.

The same-layer lead coil 138 for each winding 131 is positioned at an end of the winding 131, such as adjoining the phase lead 128. The same-layer lead coil 138 is configured such that each phase's electrical pathway starts and ends (the phase leads 128 and the neutral leads 129) on the weld end 150. As such, in embodiments, each winding 131 includes a phase lead 128, a neutral lead 129, and multiple coils 132. The coils 132 each include a same-layer lead coil 138 that includes two legs 134 that spans across multiple slots and that are inserted into respective slots at a same layer thereof. Again, the same-layer lead coil 138 positions the phase lead 128 at the weld end 150. The neutral lead 129 and the welds 133 joining the coils 132 are all positioned at the weld end 150. By keeping all connections/welds on the same side, the manufacturing process is greatly simplified as this eliminates the need to fixture coil connections/welds on both sides of the stack and can reduce epoxy application to a single step.

In some embodiments, each of the windings 131 (B1, B2, B3, B4) includes jumper coils 127 that are adapted to enable the semi-staggered azimuthal shift. In particular, one jumper coil 127 causes the shift for the forward winding segment 136, while the other causes the shift for the reverse winding segment 137. In the embodiment illustrated, the jumper coils 127 each span five slots.

Figure 11:
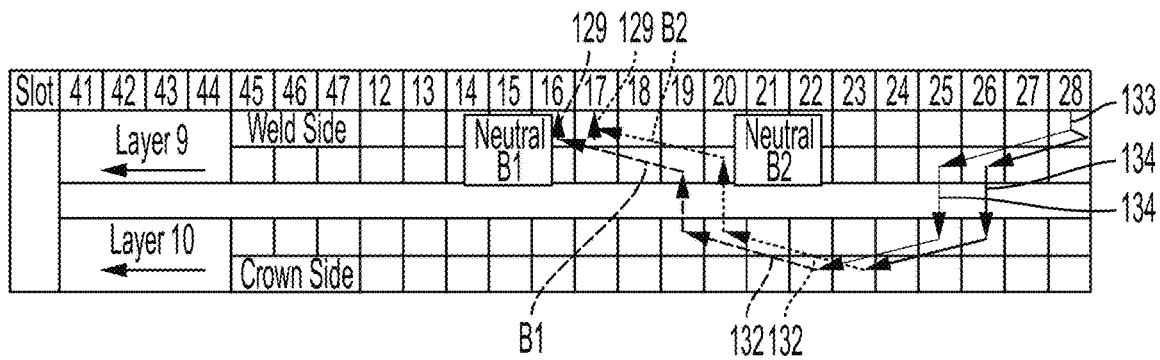
FIG. 11 is a winding diagram illustrating neutral leads of the first and second phase windings in accordance with an embodiment of the present disclosure.
Figure 12:
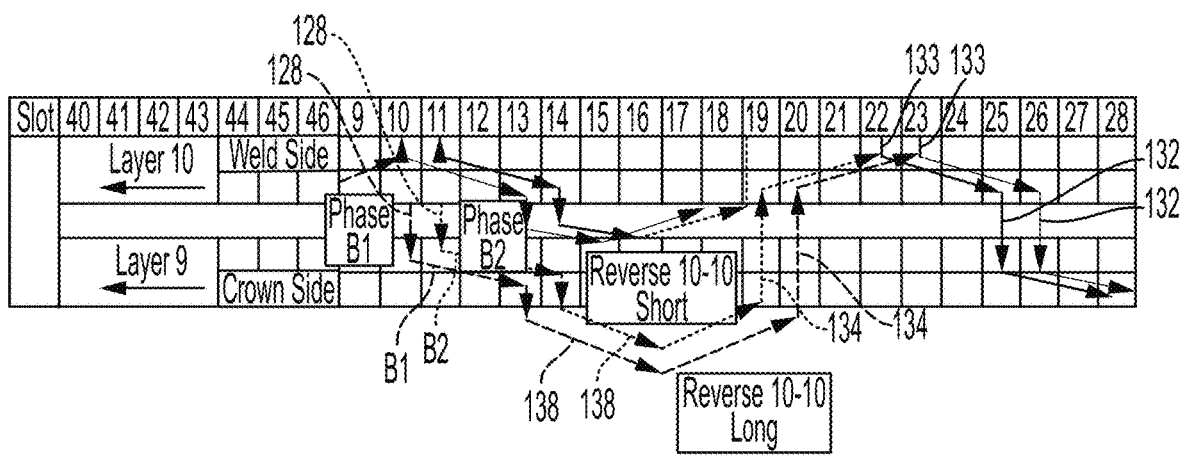
FIG. 12 is a winding diagram illustrating phase leads of the first and second phase windings in accordance with an embodiment of the present disclosure.

FIG. 11 is a winding diagram illustrating neutral leads 129 of the first and second phase windings B1, B2 in accordance with an embodiment of the present disclosure. FIG. 12 is a winding diagram illustrating phase leads 128 of the first and second phase windings B1, B2 in accordance with an embodiment of the present disclosure. Referring to FIGS. 11 and 12, in some embodiments, the winding pitch for the first and second phase windings B1 and B2 is six slots. The same-layer lead coil 138 for each of the first and second phase windings B1 and B2 are positioned at the phase ends thereof. In some embodiments, one of the legs of the same-layer lead coil 138 thereof forms the phase lead 128 for the respective phase winding B1, B2.

In the embodiment illustrated, the same-layer lead coil 138 for the first phase winding B1 includes a long pitch while the same-layer lead coil 138 for the second phase winding B2 includes a short pitch. In the embodiment illustrated in FIG. 12, the slots for each leg 132 of the same-layer lead coil 138 of the second phase winding B2 are offset by one slot relative to the slots for each leg 132 of the same-layer lead coil 138 of the first phase winding B1 such that both legs 132 of the second phase winding B2 are positioned between the legs 132 of the first phase winding B1.

Again, as can be seen in FIGS. 11 and 12, both the phase leads 128 and the neutral leads 129 are at the weld end 150 of the stator 130/stator body 135.

Figure 13:
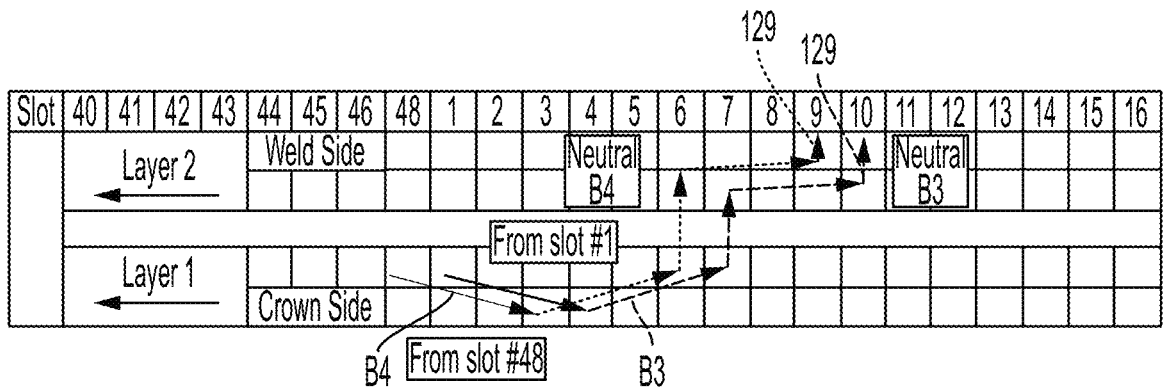
FIG. 13 is a winding diagram illustrating neutral leads of the third and fourth phase windings in accordance with an embodiment of the present disclosure.
Figure 14:
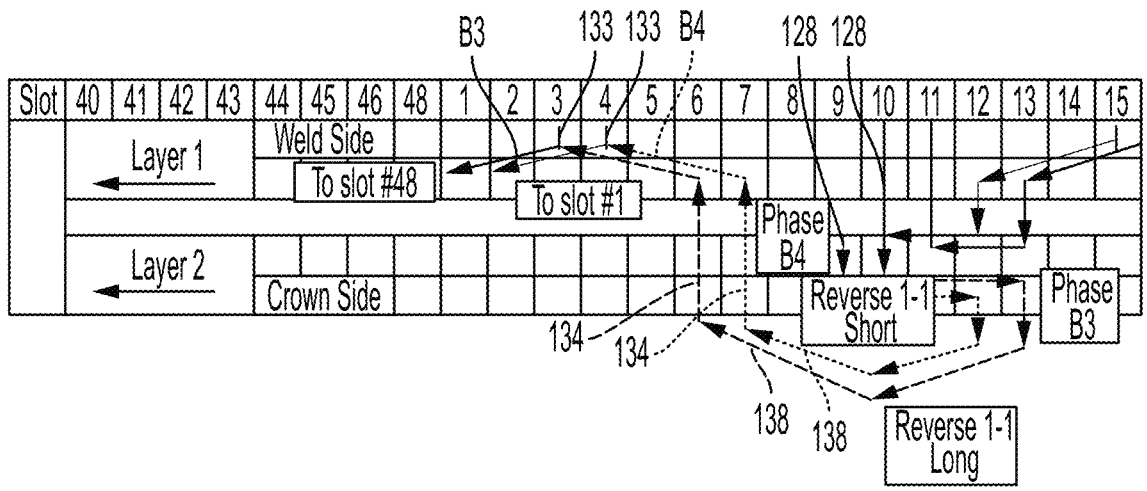
FIG. 14 is a winding diagram illustrating phase leads of the third and fourth phase windings in accordance with an embodiment of the present disclosure.

FIG. 13 is a winding diagram illustrating neutral leads 129 of the third and fourth phase windings B3, B4 in accordance with an embodiment of the present disclosure. FIG. 14 is a winding diagram illustrating phase leads 128 of the third and fourth phase windings B3, B4 in accordance with an embodiment of the present disclosure. Referring to FIGS. 13 and 14, in some embodiments, the winding pitch for the third and fourth phase windings B3 and B4 is six slots. The same-layer lead coil 138 for each of the third and fourth phase windings B3 and B4 are positioned at the phase ends thereof. In some embodiments, one of the legs of the same-layer lead coil 138 thereof forms the phase lead 128 for the respective phase winding B3, B4.

In the embodiment illustrated, the same-layer lead coil 138 for the third phase winding B3 includes a long pitch while the same-layer lead coil 138 for the fourth phase winding B2 includes a short pitch. In the embodiment illustrated in FIG. 14, the slots for each leg 132 of the same-layer lead coil 138 of the fourth phase winding B4 are offset by one slot relative to the slots for each leg 132 of the same-layer lead coil 138 of the third phase winding B3 such that both legs 132 of the fourth phase winding B4 are positioned between the legs 132 of the third phase winding B3.

Again, as can be seen in FIGS. 13 and 14, both the phase leads 128 and the neutral leads 129 are at the weld end 150 of the stator 130/stator body 135.

While FIGS. 7-14 describe embodiments of the phase windings B1-B4 for phase B of the windings 131 of the motor stator 130, in various embodiments, the phase windings A1-A4 for phase A and the phase windings C1-C4 for phase C are similarly configured to include windings 131 with phase segments 138, 139, phase leads 128 and neutral leads 129 at the weld end 150 of the motor stator 130/stator body 135, the same-layer lead coils 138, the same-layer jumper coil 139, and the like.

Figure 15:
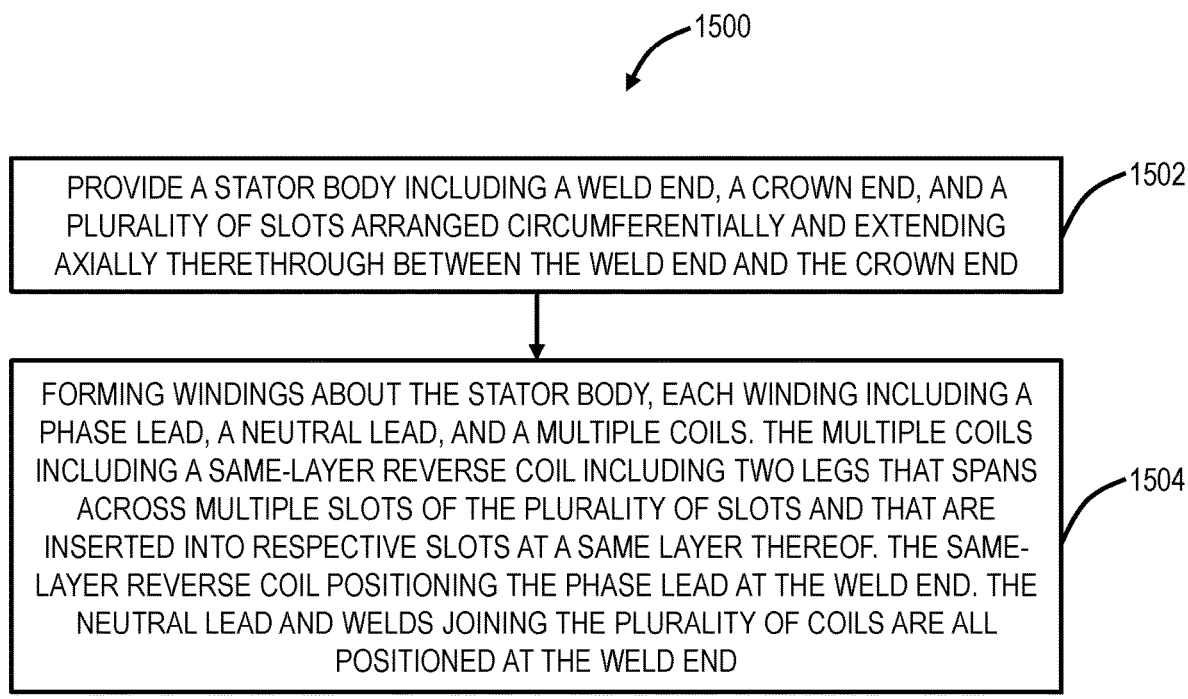
FIG. 15 is a flow chart of a method for assembling a motor stator for a motor.

FIG. 15 is a flow chart of a method 1500 for assembling a motor stator 130 for a motor 110. The method includes providing a stator body including a weld end, a crown end, and a plurality of slots arranged circumferentially and extending axially therethrough between the weld end and the crown end at step 1502. The method also includes forming windings about the stator body at step 1504. Each of the windings including a phase lead, a neutral lead, and multiple coils. The multiple coils include a same-layer lead coil including two legs that spans across multiple slots of the plurality of slots and that are inserted into respective slots at a same layer thereof. The same-layer lead coil positions the phase lead at the weld end. The neutral lead and welds joining the multiple coils are all positioned at the weld end.

In some embodiments of the method, the phase lead is at an end of a leg of the same-layer lead coil for each respective winding.

In some embodiments of the method, each respective winding includes a forward winding segment wound in a first azimuthal direction, a reverse winding segment wound in a second azimuthal direction, opposite the first azimuthal direction, and a same-layer jumper coil connecting the forward winding segment to the reverse winding segment, each leg of the same-layer jumper coil being slotted in a respective slot at a same layer thereof. In some of these embodiments, the forward winding segment and the reverse winding segment are semi-staggered, such that legs of coils for the reverse winding segment are clocked one slot relative to legs of corresponding coils for the forward winding segment.

In some embodiments of the method, the plurality of windings are arranged for multiple phases, and each phase includes a pair of windings that are semi-staggered, such that legs of coils for a first winding are clocked one slot relative to legs of corresponding coils for a second winding. In some of these embodiments, the same-layer lead coil for the first winding is a long coil and the same-layer lead coil for the second winding is a short coil, and wherein legs of the short coil are slotted between legs of the long coil at a same layer thereof.

In some embodiments, the method further includes positioning a busbar at the weld end and forming the connections thereto at the weld end. In these embodiments, the phase lead and the neutral lead welds for each of the plurality of windings is formed at the weld end such that all welds of the motor stator are formed at the weld end.

Figure 16:
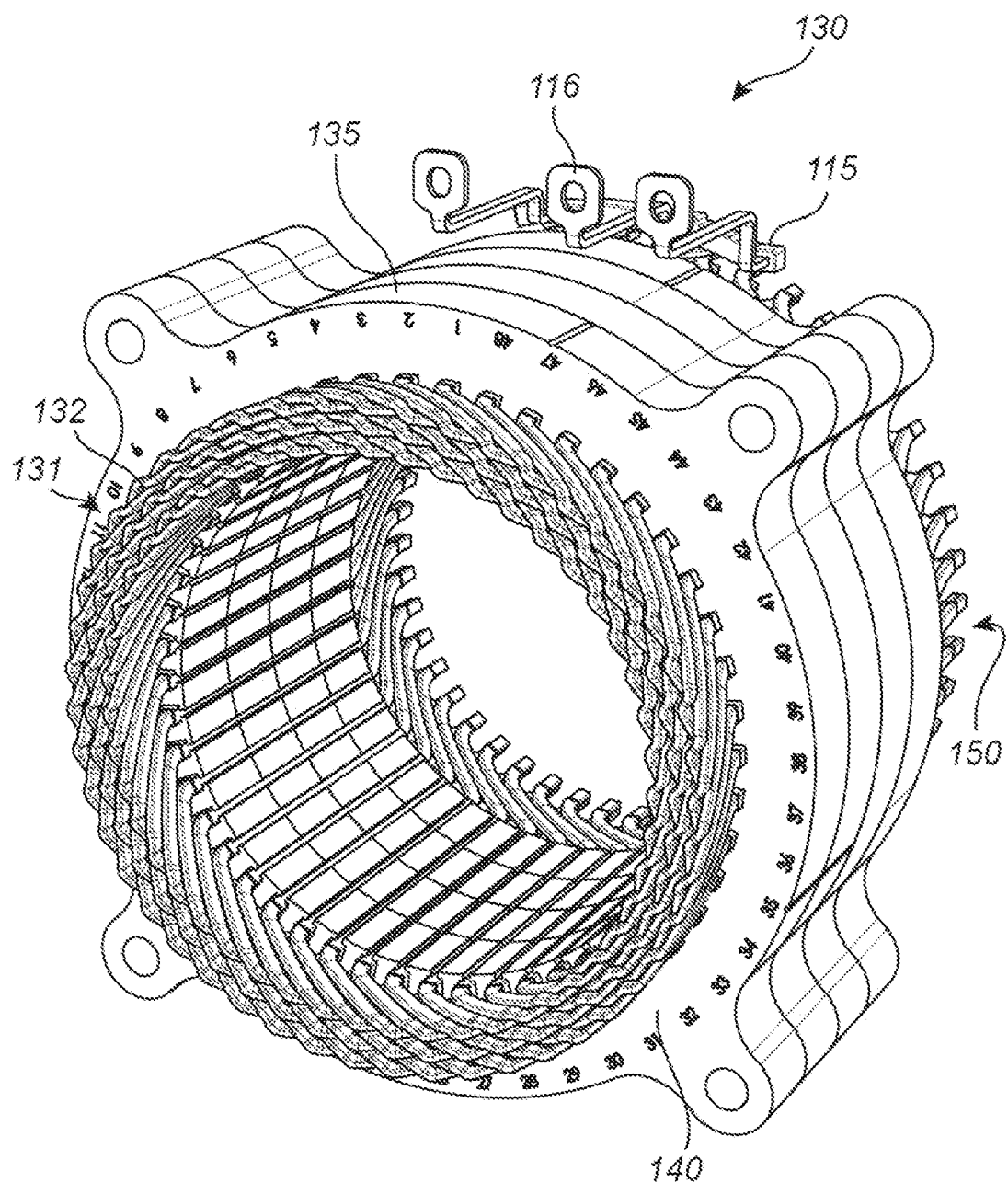
FIG. 16 is a perspective view of a crown end of a motor stator in accordance with an embodiment of the present disclosure.
Figure 17:
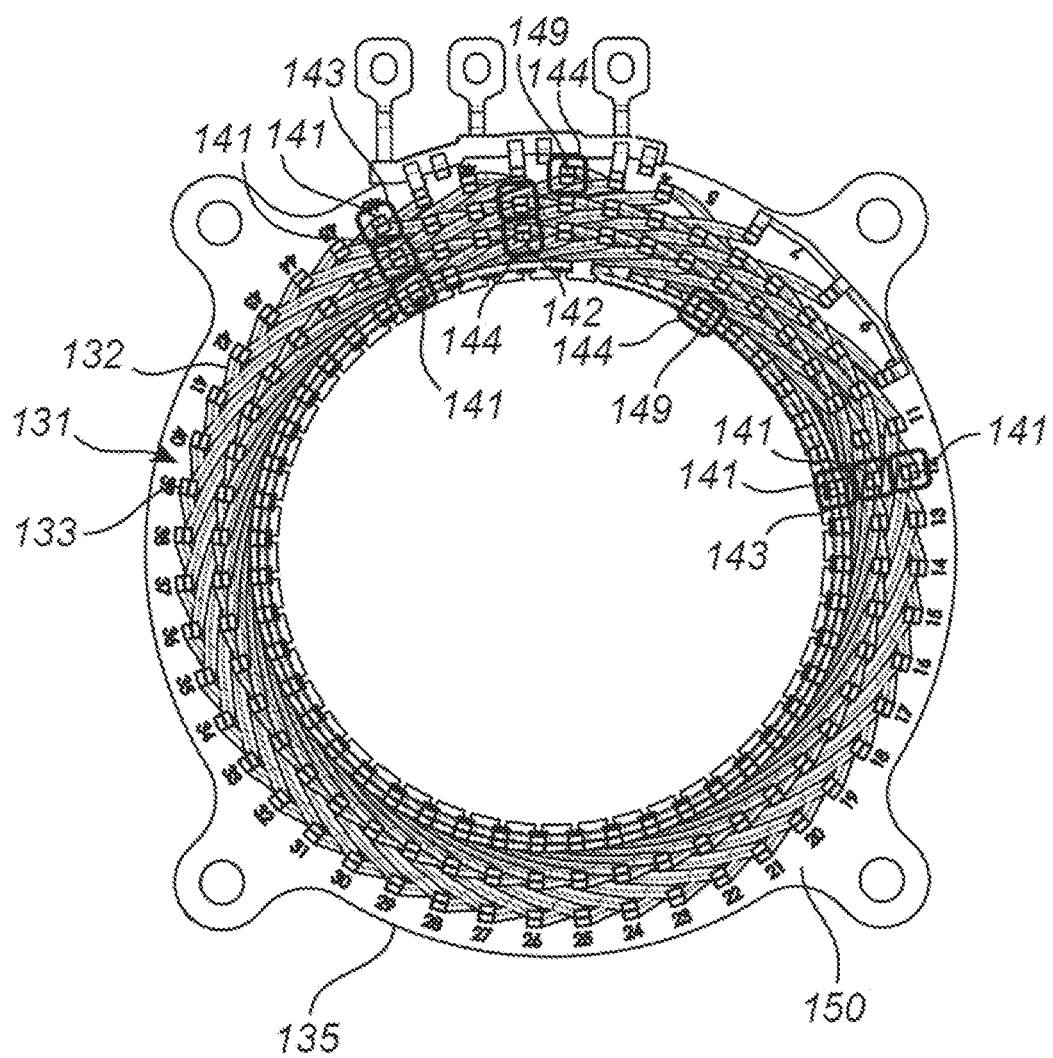
FIG. 17 is a perspective view of the weld end of the motor stator of FIG. 16.
Figure 18:
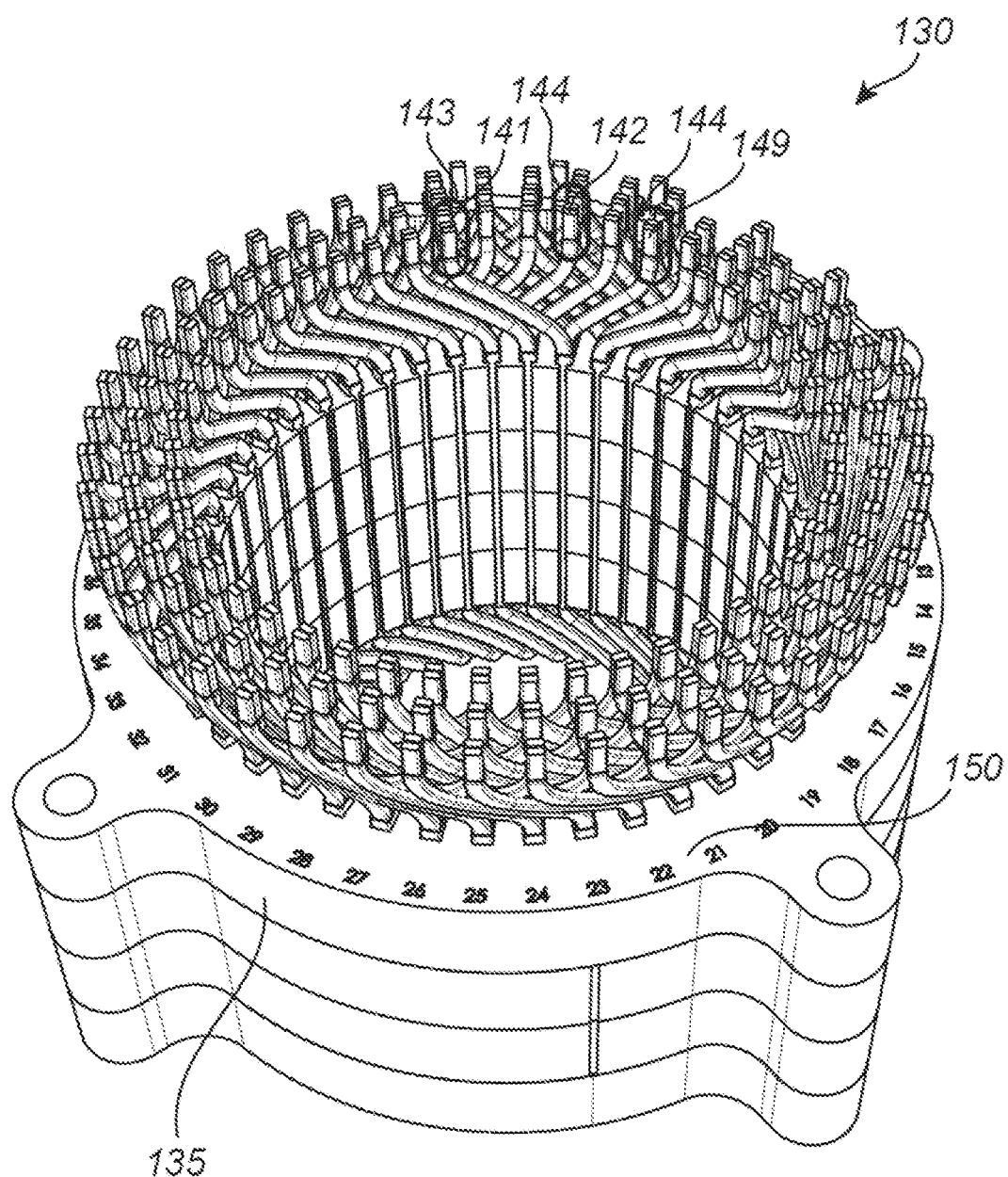
FIG. 18 is another perspective view of the weld end of the motor stator of FIGS. 16 and 17 highlighting weld pairs with a reverse twist, weld pairs with an uneven span, and weld pairs with a jumper connection.
Figure 19:
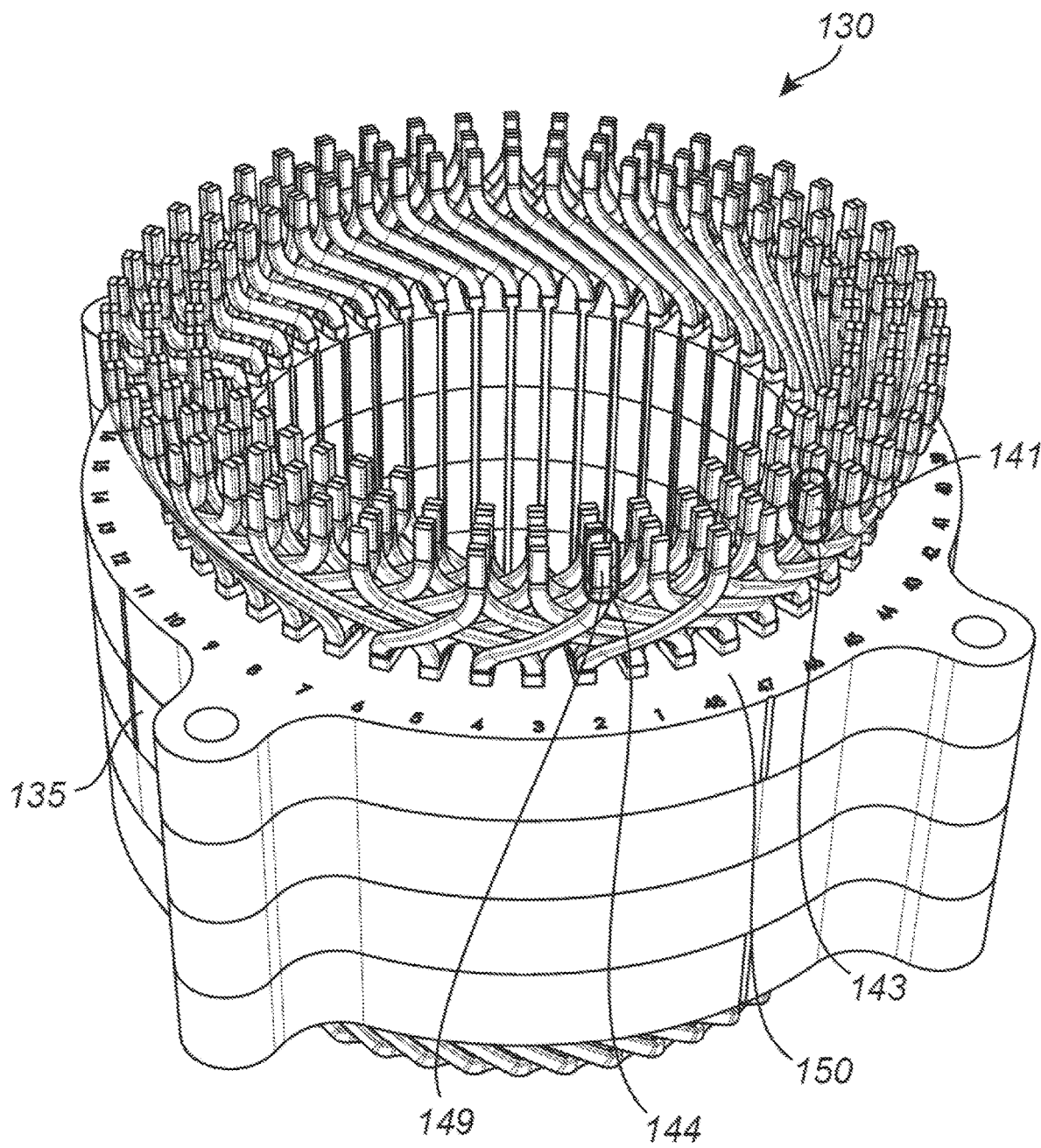
FIG. 19 is a further perspective view of the weld end of the motor stator of FIG. 16-18 further highlighting weld pairs with a reverse twist.

FIG. 16 is a perspective view of a crown end 140 of a motor stator 130 in accordance with an embodiment of the present disclosure. FIG. 17 is a perspective view of the weld end 150 of the motor stator 130 of FIG. 16. FIG. 18 is another perspective view of the weld end 150 of the motor stator 130 of FIGS. 16 and 17 highlighting weld pair 149 with a reverse twist 144, weld pairs with an uneven span, and weld pairs 141 with a jumper connection. FIG. 19 is a further perspective view of the weld end 150 of the motor stator 130 of FIG. 16-18 further highlighting weld pairs with a reverse twist, uneven spans, and layer-to-layer jumper connections. Referring to FIGS. 16-19, in various embodiments, the motor stator 130 includes a stator body 135, a weld end 150, a crown end 140, windings 131, and a busbar 115. In embodiments, the busbar includes terminals 116.

In various embodiments, the motor stator 130 includes a semi-staggered phase layout that includes same-layer lead coils in the windings 131 that result in all electrical pathways beginning and ending on the weld end 150 of the motor stator 130. As such, as can be seen in FIGS. 16-19, all welds of the motor stator 130, including welds 133 joining ends of coils together to form the windings 131 and welds to the busbar 115, and in particular, the electrical connections to the terminals 116, are formed on the weld end 150. As can be seen in FIG. 16, in the embodiment illustrated, the crown end 140 does not include any welds.

Similar to the embodiments discussed above, the terminals 116 are configured to be coupled to respective phases (e.g., A, B, and C) of the motor 110. The stator body 135 includes multiple slots (e.g., 48 circumferentially positioned slots arranged between a plurality of stator teeth, Refer to FIG. 6), each slot including multiple layers (refer to FIG. 6). The number of layers in a winding layout is defined by the number of conductors in each slot (e.g., stacked radially). In some arrangements, every conductor constitutes one layer. In the embodiment illustrated, the slots include six layers, where the layers are positioned radially.

In various embodiments, each winding 131 includes multiple coils 132 welded together, with the welds 133 positioned and being formed on the weld end 150 of the motor stator 130. In embodiments, the coils 132 are wires, such as hairpins. Each coil 132 generally includes two legs 134, where the coil 132 is inserted from the crown end 140 and each leg of the coil 132 is inserted into one of the slots at one of the layers thereof and extends axially through the stator body 135 such that the lead end thereof extends from the stator body 135 at the weld end 150. Multiple coils 132 are arranged in the slots (e.g., meeting each other at welds 133). For example, a coil 132 includes two legs 134 configured to fit into two respective slots (i) at a radial position (e.g., the two legs configured to fit in a first layer and second layer, respectively. Corresponding legs 134 of two adjoining coils 132 are twisted and joined together, to form an electrical connection between the two respective coils, forming a weld pair 141, 142, 149. While the embodiment described refers to the coils being welded together, in other embodiments, other metallurgical bonds are used to join the corresponding legs of the two respective coils.

Figure 25:
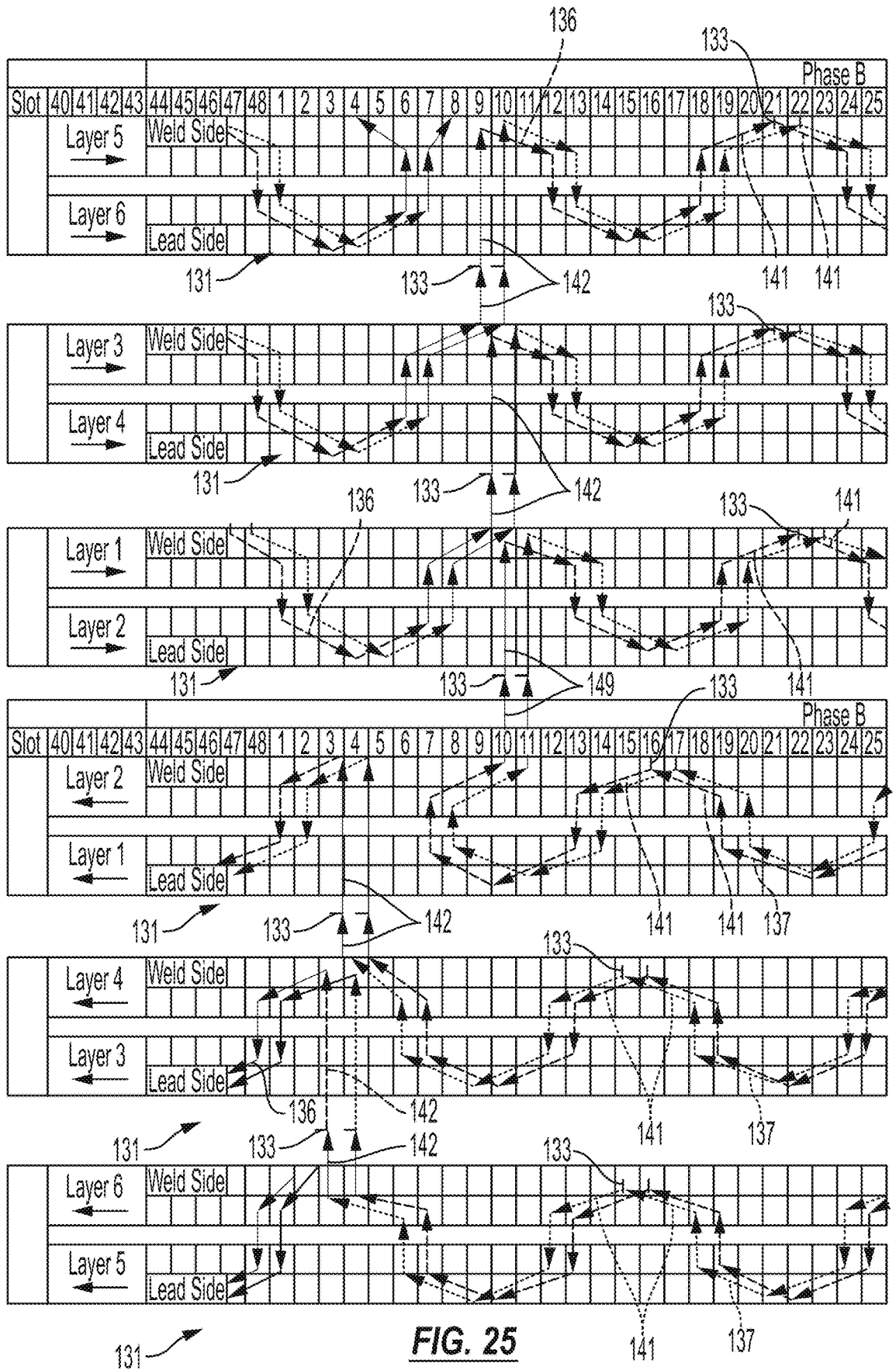
FIG. 25 is a first portion of a winding diagram highlighting jumps between conductor layer pairs, span changes, and same-layer reversal connections.
Figure 26:
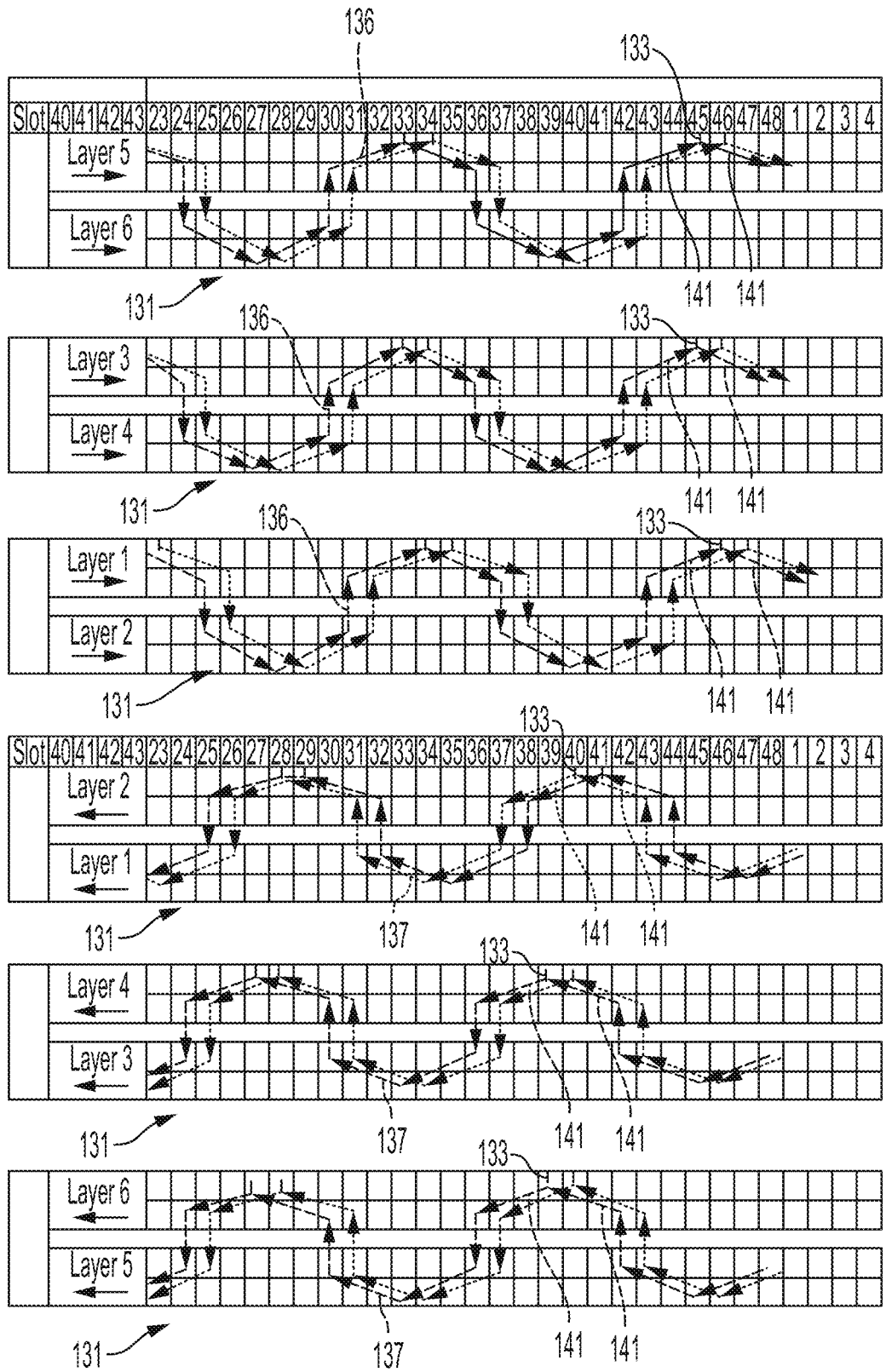
FIG. 26 is a second portion of the winding diagram of FIG. 25.

Layers are typically grouped together to form conductor pairs. For example, in the embodiment illustrated in FIGS. 16-19 (also refer to FIGS. 25 and 26 illustrating an exemplary winding diagram of phase B), the conductor pairs are layers 1-2, layers 3-4, and layers 5-6, where multiple coils 132 form a section of each winding 131 that jumps back and forth between the layers of the conductor pair, where the coil 132 jumps between the layers of the conductor pairs in one radial direction (on the crown end 140) and the standard weld pairs 141 jump between the layers of the conductor pair in the opposite radial direction (on the weld end 150). In various embodiments, each of the forward and reverse winding of each winding 131 includes a section spanning along each conductor pair (e.g. a section jumping between layers 1-2, a section jumping between layers 3-4, and a section jumping between layers 5-6).

In various embodiments, each winding 131 includes jumper weld pairs 142 that jump between sections in adjoining conductor pairs, such as by jumping between layers 2-3 (i.e. jumping between the layers 1-2 conductor pair and the layers 3-4 conductor pair) or layers 4-5 (i.e. jumping between the layers 3-4 conductor pair and the layers 5-6 conductor pair). By forming the jumps between conductor pairs with the jumper weld pairs 142, a number of unique coils 132 used to form the windings 131 can be reduced and all of the welds 133 can be formed on the weld end 150, which simplifies the manufacturing process.

Figure 20:
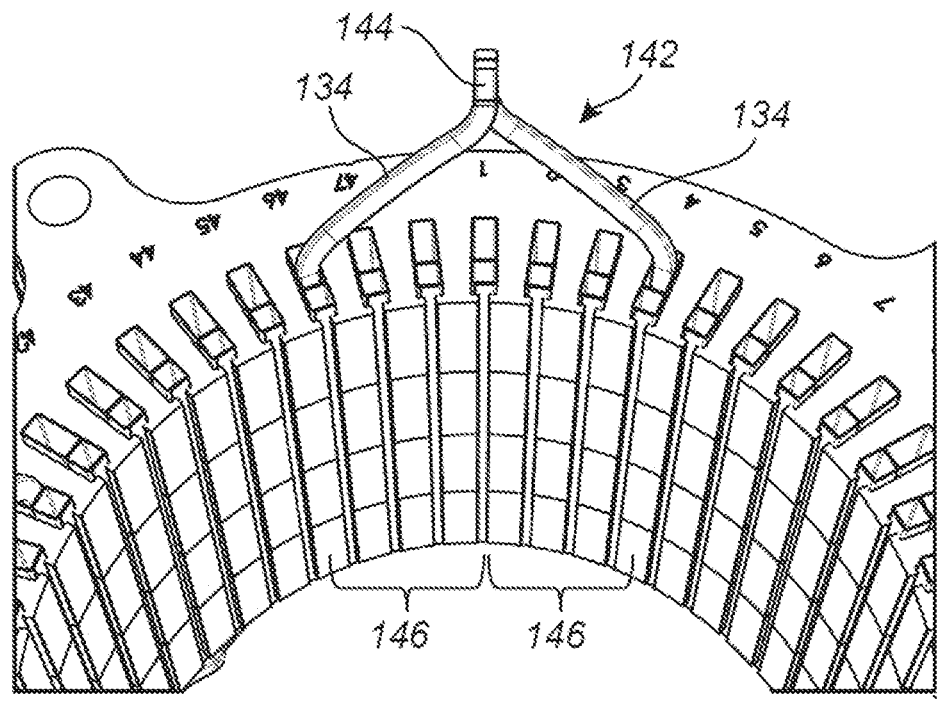
FIG. 20 is a perspective view of a jumper weld pair, of the motor stator of FIGS. 16-19.
Figure 21:
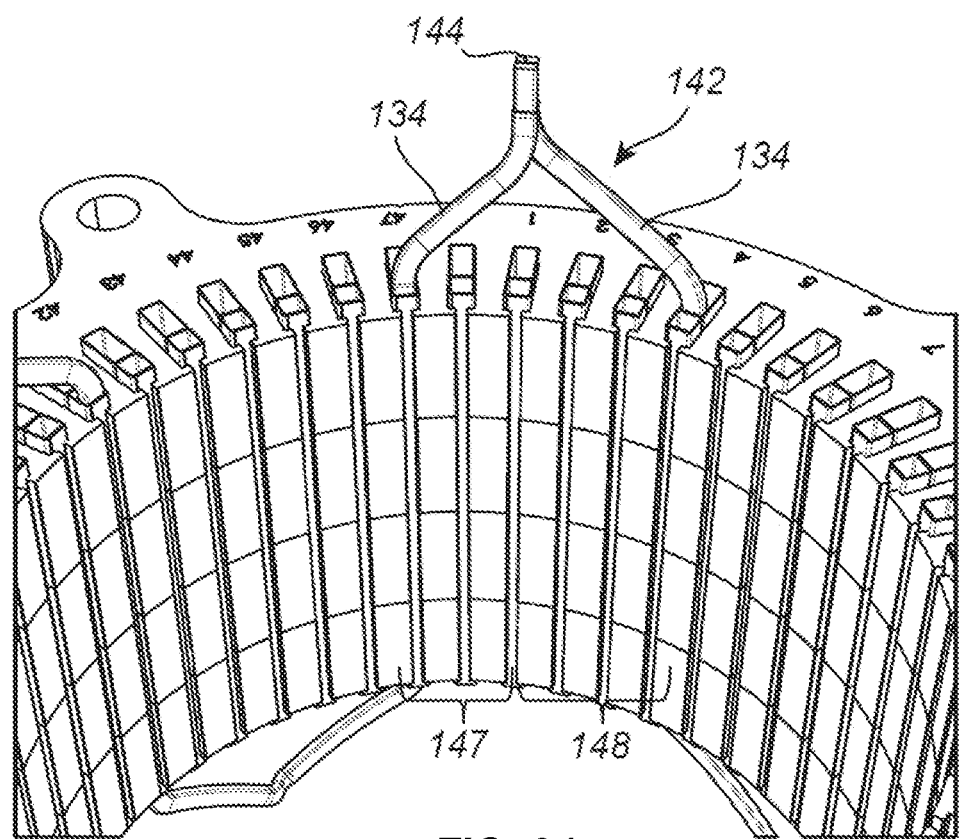
FIG. 21 is a perspective view of a jumper weld pair with uneven spans of the motor stator of FIGS. 16-19.

FIG. 20 is a perspective view of a jumper weld pair 142, of the motor stator 130 of FIGS. 16-19. FIG. 21 is a perspective view of a jumper weld pair 142, with uneven spans 147, 148 and a reverse twist 144, of the motor stator 130 of FIGS. 16-19. Referring to FIGS. 17-21, in various embodiments, the standard weld pairs 141 include a standard twist 143 where the legs 134 of adjoining coils 132 forming the respective standard weld pair 141 are twisted together (for the welding thereof) in a first circumferential direction, and the jumper weld pairs 142 include a reverse twist 144 where the legs 134 of adjoining coils 132 forming the respective jumper weld pair 142 are twisted together (for the welding thereof) in a second circumferential direction, opposite the first circumferential direction. For example, in the embodiment illustrated, the standard twist 143 is twisted in the clockwise direction and the reverse twist 144 is twisted in the counter-clockwise direction. By forming the jumper weld pairs 142 with the reverse twist 144, radial spacing between the jumper weld pairs 142 and adjoining standard weld pairs 141 can be optimized, improving both manufacturability and thermal management of the motor stator 130. Thus, in embodiments, the jumper weld pair 142 with a reverse twist 144 includes a first leg 134 in a first slot and a second leg 134 in a second slot, and the jumper weld pair 142 with the reverse twist 144 includes a twist of the first and second legs 134 in a direction different from a twist in another of the weld pairs 141.

As can be seen in FIGS. 20 and 21, in various embodiments, the jumper weld pairs 142 include both even and uneven twist end spans 146, 147, 148. In the embodiment illustrated, jumper weld pairs 142 with an even total twist span (such as a standard 6 slot span) includes even twist spans 146 (each twist being the same, such as spanning 3 slots), and jumper weld pairs 142 with an uneven total twist span (such as a short 5 slot span or a long 7 slot span) includes a leg 134 with a short twist span 147 (spanning from the slot to the weld 144) and a leg 134 with a long twist span 148 (spanning from the slot to the weld 144) that is at least one slot longer than the short twist span 147 (rather than each being half of the total span). In the embodiment illustrated, for a total twist span of 5, the short twist span 147 is 2 and the long twist span 148 is 3. Similarly, for a total twist span of 7, the short twist span 147 is 3 and the long twist span 148 is 4. Other even and uneven twist spans, such as short and long slot spans with even twist spans and standard slot spans with uneven twist spans, are also contemplated and utilized in various embodiments. Thus, in embodiments, the jumper weld pair 142 with uneven twist end spans includes a first leg 134 in a first slot and a second leg in a second slot, the first and second legs 134 joined together at a weld position, and the jumper weld pair 142 with the uneven twist end spans includes a twist forming a first span spanning from the first slot to the weld position different from a second span spanning from the second slot to the weld position. The use of various total twist spans can facilitate the semi-staggering of the motor stator 130, while the uneven twist spans of each leg 134 can facilitate optimization of circumferential spacing between welds 133 improving both manufacturability and thermal management of the motor stator 130.

Figure 22:
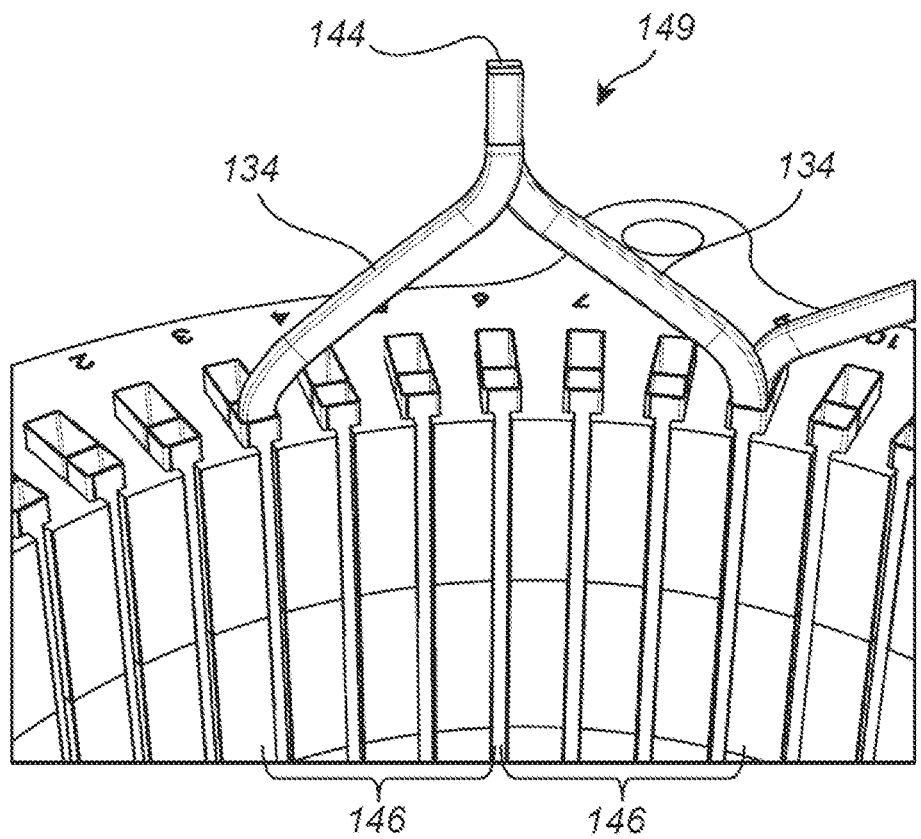
FIG. 22 is a perspective view of a same layer jumper weld pair, with a reverse twist, of the motor stator of FIGS. 16-19.
Figure 23:
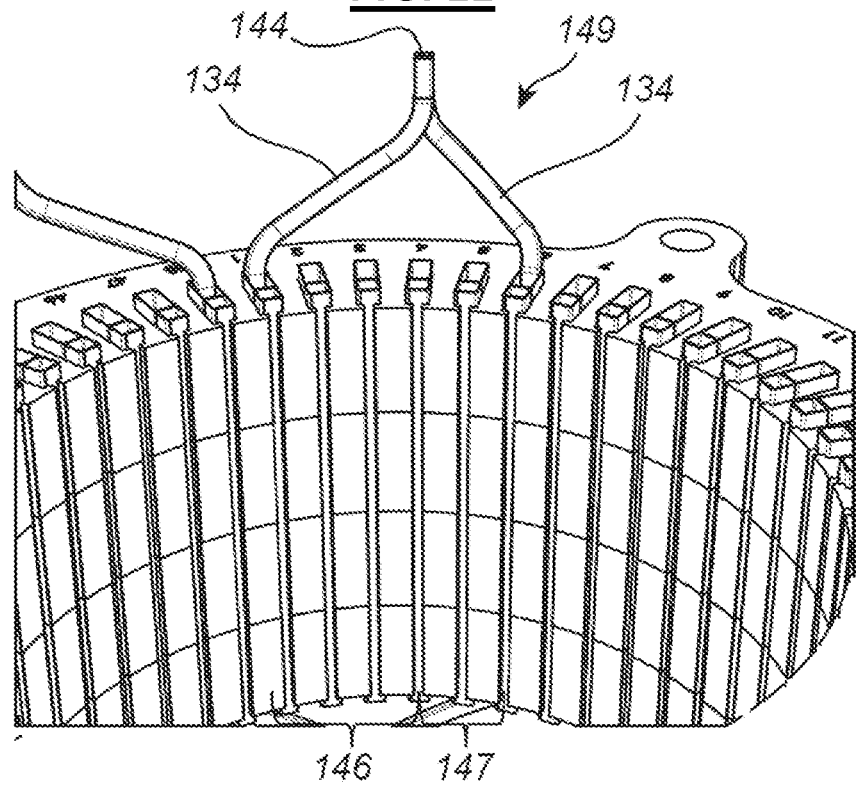
FIG. 23 is a perspective view of a same layer jumper weld pair, with uneven spans and a reverse twist, of the motor stator of FIGS. 16-19.
Figure 24:
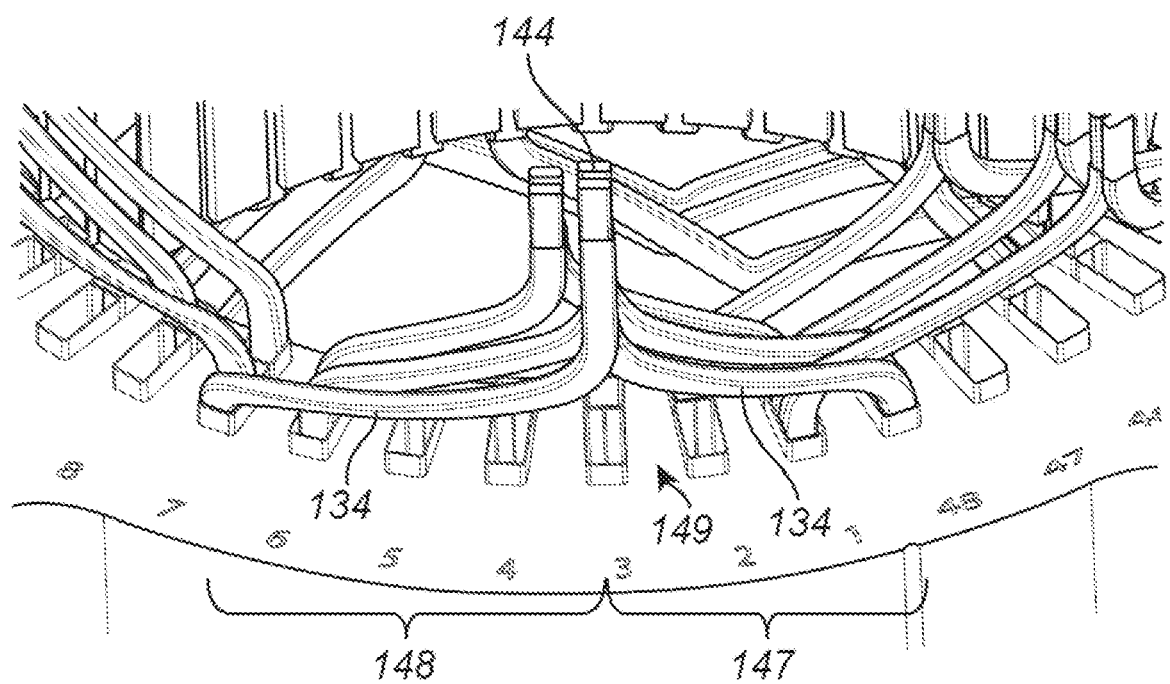
FIG. 24 is another perspective view of a same layer jumper weld pair, with uneven spans and a reverse twist, of the motor stator of FIGS. 16-19.

FIG. 22 is a perspective view of a same layer jumper weld pair, with a reverse twist, of the motor stator of FIGS. 16-19. FIG. 23 is a perspective view of a same layer jumper weld pair, with uneven spans and a reverse twist, of the motor stator of FIGS. 16-19. FIG. 24 is another perspective view of a same layer jumper weld pair, with uneven spans and a reverse twist, of the motor stator of FIGS. 16-19. Referring to FIGS. 16-19 and 22-24, in various embodiments, each winding 131 includes a same-layer jumper weld pair 149 that joins a forward winding segment and a reverse winding segment of each winding 131 together. The same-layer jumper weld pair 149 can include a standard, long, and short span with each leg 134 of the same-layer weld pair 149 being slotted in a respective slot at a same layer thereof. In the embodiment illustrated, the same-layer jumper weld pairs 149 are positioned in one of layer 1 and layer 6. By forming the same-layer jumps at the weld end with same-layer weld pairs 149, a number of unique coils 132 used to form the windings 131 can be reduced and all of the welds 133 can be formed on the weld end 150, which simplifies the manufacturing process. In embodiments, the same-layer jumper weld pair 149 with a reverse twist 144 includes a first leg 134 in a first slot and a second leg 134 in a second slot, and same-layer jumper weld pair 149 with the reverse twist 144 includes a twist of the first and second legs 134 in a direction different from a twist in another of the weld pairs 141.

In various embodiments, the same-layer jumper weld pair 149 include both even and uneven twist end spans 146, 147, 148. In the embodiment illustrated, same-layer jumper weld pair 149 with an even total twist span (such as a standard 6 slot span) includes even twist spans 146 (each twist being the same, such as spanning 3 slots), and same-layer jumper weld pair 149 with an uneven total twist span (such as a short 5 slot span or a long 7 slot span) includes a leg 134 with a short twist span 147 (spanning from the slot to the weld 144) and a leg 134 with a long twist span 148 (spanning from the slot to the weld 144) that is at least one slot longer than the short twist span 147 (rather than each being half of the total span). In the embodiment illustrated, for a total twist span of 5, the short twist span 147 is 2 and the long twist span 148 is 3. Similarly, for a total twist span of 7, the short twist span 147 is 3 and the long twist span 148 is 4. Other even and uneven twist spans, such as short and long slot spans with even twist spans and standard slot spans with uneven twist spans, are also contemplated and utilized in various embodiments. Thus, in embodiments, the same-layer jumper weld pair 149 with uneven twist end spans includes a first leg 134 in a first slot and a second leg in a second slot, the first and second legs 134 joined together at a weld position, and the same-layer jumper weld pair 149 with the uneven twist end spans includes a twist forming a first span spanning from the first slot to the weld position different from a second span spanning from the second slot to the weld position. The use of various total twist spans can facilitate the semi-staggering of the motor stator 130, while the uneven twist spans of each leg 134 can facilitate optimization of circumferential spacing between welds 133 improving both manufacturability and thermal management of the motor stator 130.

While the reverse twists 144 and the uneven twist end spans 147 and 148 are illustrated with regards to jumper weld pairs 142 and same-layer jumper weld pairs 149, in embodiments, other weld pairs 141 include the reverse twists 144, the uneven twist end spans 147 and 148, or a combination of the reverse twists 144 and the uneven twist end spans 147 and 148. Thus, in embodiments, the weld pair 141 with a reverse twist 144 includes a first leg 134 in a first slot and a second leg 134 in a second slot, and the weld pair 141 with the reverse twist 144 includes a twist of the first and second legs 134 in a direction different from a twist in another of the weld pairs 141. In embodiments, the weld pair 141 with uneven twist end spans includes a first leg 134 in a first slot and a second leg in a second slot, the first and second legs 134 joined together at a weld position, and the weld pair 141 with the uneven twist end spans includes a twist forming a first span spanning from the first slot to the weld position different from a second span spanning from the second slot to the weld position.

FIG. 25 is a first portion of a winding diagram highlighting jumps between conductor layer pairs, span changes, and same-layer reversal connections. FIG. 26 is a second portion of the winding diagram of FIG. 25. Referring to FIGS. 25 and 26, as noted above, layers are typically grouped together to form conductor pairs and jumps between conductor pairs are included in each winding 131. In the embodiment illustrated, the conductor pairs are layers 1-2, layers 3-4, and layers 5-6, and each winding 131 includes jumper weld pairs 142 that jump between layers 2-3 (i.e. jumping between the layers 1-2 conductor pair and the layers 3-4 conductor pair) and layers 4-5 (i.e. jumping between the layers 3-4 conductor pair and the layers 5-6 conductor pair). In embodiments, each winding 131 includes jumper weld pairs 142 that jump between each of the conductor pairs in both the forward winding segment 136 and the reverse winding segment 137. In the embodiment illustrated, each phase includes two windings 131 (the reference numbers in FIGS. 25 and 26 are all shown on one of the windings 131. The same references apply to the other winding 131 shown). As each winding 131 includes two jumper weld pairs 142 between each set of adjoining conductor pairs, each phase includes four jumper weld pairs 142 that jumps between each set of adjoining conductor pairs. Thus, in some embodiments with three phases, the motor stator 130 includes twelve jumper weld pairs 142 between each set of adjoining conductor pairs, such as twelve jumper weld pairs 142 that jump between layers 2-3 (i.e. jumping between the layers 1-2 conductor pair and the layers 3-4 conductor pair) and twelve jumper weld pairs 142 that jump between layers 4-5 (i.e. jumping between the layers 3-4 conductor pair and the layers 5-6 conductor pair).

Figure 27:
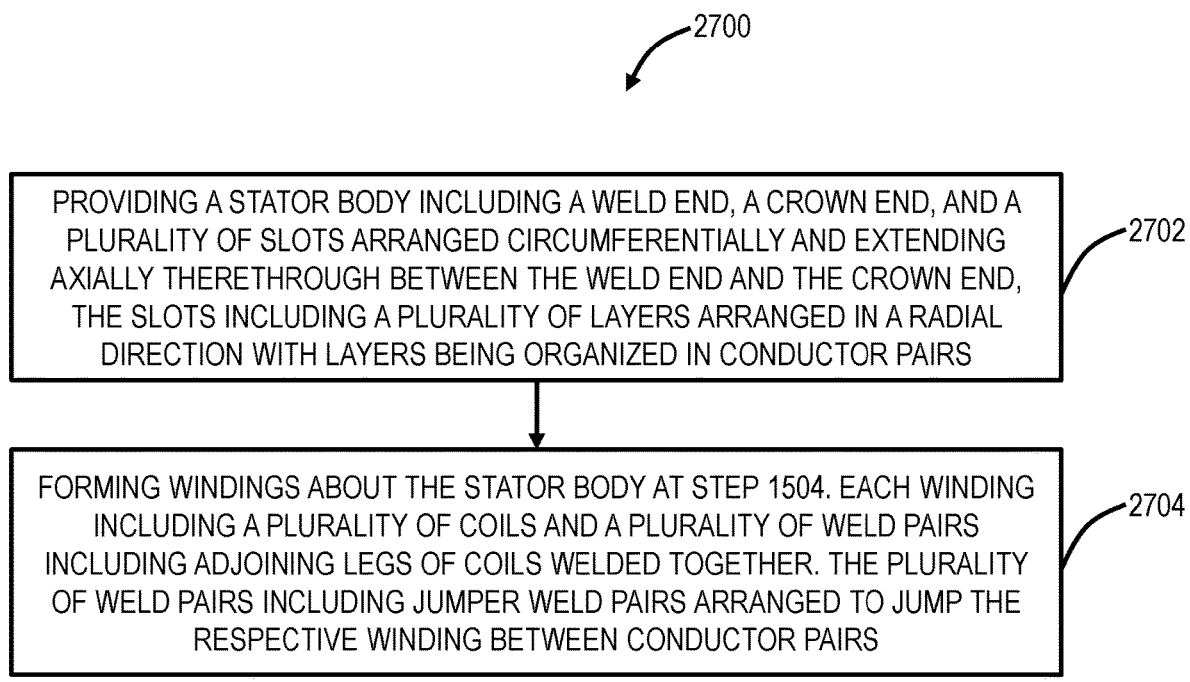
FIG. 27 is a method for assembling a motor stator for a motor.

FIG. 27 is a method 2700 for assembling a motor stator 130 for a motor 110. The method includes providing a stator body including a weld end, a crown end, and a plurality of slots arranged circumferentially and extending axially therethrough between the weld end and the crown end, the slots including a plurality of layers arranged in a radial direction with layers being organized in conductor pairs at step 2702. The method also includes forming windings about the stator body at step 1504. Each winding including a plurality of coils and a plurality of weld pairs including adjoining legs of coils welded together. The plurality of weld pairs including jumper weld pairs arranged to jump the respective winding between conductor pairs.

In some embodiments of the method, all of the weld pairs are all positioned at the weld end.

In some embodiments of the method, each of the jumper weld pairs is twisted in a reverse direction relative to a twist of weld pairs jumping between layers within a conductor pair of layers.

In some embodiments of the method, at least one of the jumper weld pairs includes uneven twist end spans where each leg of the at least one of the jumper weld pair includes a different span spanning from a respective slot to a weld joining the at least one of the jumper weld pair together.

In some embodiments of the method, each respective winding includes a forward winding segment wound in a first circumferential direction, a reverse winding segment wound in a second circumferential direction, opposite the first circumferential direction, and a same-layer jumper weld pair connecting the forward winding segment to the reverse winding segment, each leg of the same-layer jumper weld pair being slotted in a respective slot at a same layer thereof. In some of these embodiments, the same-layer jumper weld pair is twisted in a reverse direction relative to a twist of weld pairs jumping between layers within a conductor pair of layers. In some of these embodiments, the same-layer jumper weld pair include uneven twist end spans where each leg of the same-layer jumper weld pair includes a different span spanning from a respective slot to a weld joining the same-layer jumper weld pair together.

While the method 2700 discloses forming a motor stator with various combinations of the complex twisting disclosed herein, other methods forming a motor stator with other combinations of the complex twisting are also contemplated.

By including various combinations of the complex twisting disclosed herein, namely, reverse twisting of some of the weld pairs, uneven twist end spans of some of the weld pairs, use of jumper weld pairs to jump between conductor pairs, and use of same-layer jumper weld pairs, a semi-staggered bar wound motor stator can be formed that can minimize the total number of unique coil types, such as to three unique coil types, that can include all welds on the weld end, and can improve overall spacing between different types of weld pairs, which improve the manufacturability, efficiency, and durability of the motor stator.

Figure 28:
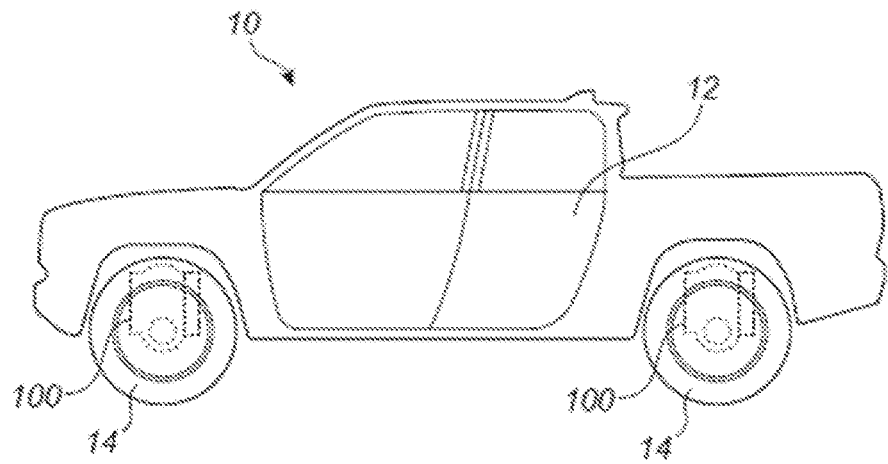
FIG. 28 is a schematic diagram of one illustrative embodiment of a vehicle of the present disclosure.

FIG. 28 is a schematic diagram of one illustrative embodiment of a vehicle 10 of the present disclosure. Referring now to FIG. 28, in various embodiments the vehicle 10 includes a vehicle body 12 and at least one wheel 14 coupled to the vehicle body 12 that is adapted to be driven by at least one e-axle 100 of the present disclosure, including the motor stator 130 and the motor rotor 120 that is coupled to a drivetrain for the at least one wheel 14. For example, as depicted in FIG. 2, the motor rotor 120 is configured to rotate relative to the motor stator 130.

Figure 29:
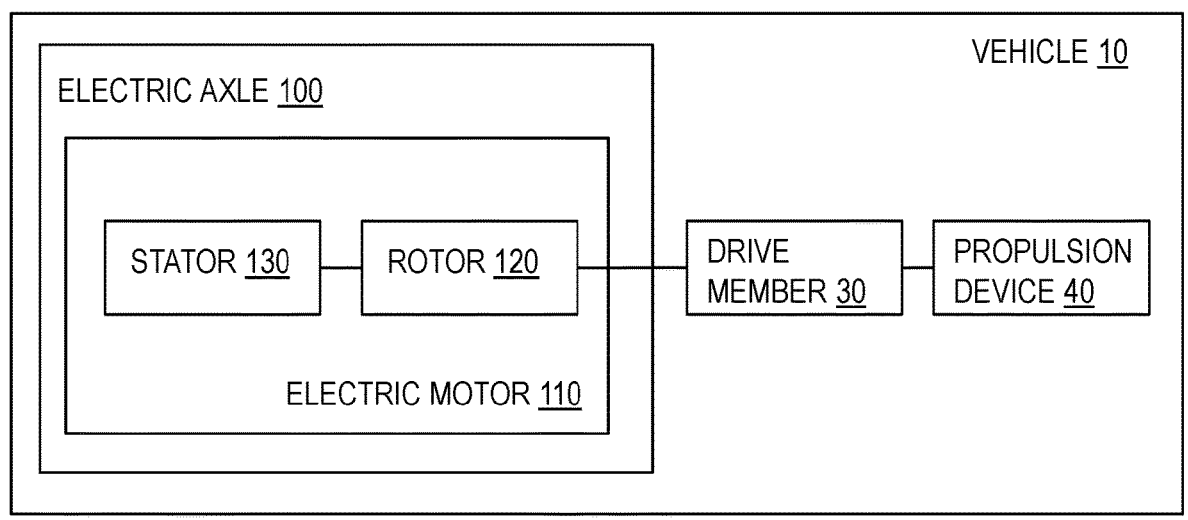
FIG. 29 is a block diagram of another illustrative embodiment of a vehicle of the present disclosure.

FIG. 29 is a block diagram of another illustrative embodiment of a vehicle 10 of the present disclosure. Referring to FIG. 29, in various embodiments an illustrative vehicle 10 includes at least one drive member 30, at least one propulsion device 40, and at least one e-axle 100. In embodiments, the at least one drive member 30 is integral to the e-axle 100. The at least one propulsion device 40 is coupled to the at least one drive member 30. The electric motor 110 includes the motor stator 130 having all welds for the windings on a single side thereof and a motor rotor 120 configured to rotate relative to the motor stator 130. The motor rotor 120 is coupled to the at least one drive member 30.

It will be appreciated that the vehicle 10 can be any type of vehicle whatsoever as desired without limitation. Given by way of non-limiting example, in various embodiments the vehicle 10 may be an electric vehicle (that is, an all-electrically driven vehicle) or a hybrid vehicle. For example, and given by way of non-limiting examples, in various embodiments the vehicle 10 may include a motor vehicle driven by wheels, such as the vehicle 10 illustrated in FIG. 28, and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 10 may include a marine vessel such as, without limitation, a boat, a ship, a submarine, a submersible, an autonomous underwater vehicle (AUV), and the like. Given by way of further non-limiting examples, in various embodiments the vehicle 10 may include an aircraft such as, without limitation, a fixed wing aircraft, a rotary wing aircraft, and a lighter-than-air (LTA) craft.

In various embodiments the e-axle (or e-axles) 100 are configured to drive the vehicle 10 via the corresponding electric motor(s) 110 thereof. That is, in various embodiments the e-axle (or e-axles) 100 may drive any drive member 30 that drives any propulsion device 40, such as without limitation a wheel or wheels, a track or tracks, a propeller or propellers, a propulsor or propulsors, a rotor or rotors, or the like, associated with the vehicle 10.

For example, in some embodiments in a motor vehicle one e-axle 100 and its corresponding electric motor 110 may be configured to drive one drive member 30 such as an axle or a chain ring that drives one wheel or track, in some other embodiments in a motor vehicle one e-axle 100 and its corresponding electric motor 110 may be configured to drive an axle that rotates two wheels or two tracks, and in some other embodiments in a motor vehicle one e-axle 100 and its corresponding electric motor 110 may be configured to drive an axle that rotates one wheel or one track and another e-axle 100 and its corresponding electric motor 110 is configured to drive another axle that rotates another wheel or another track.

Similarly, in some embodiments in a marine vessel one e-axle 100 and its corresponding electric motor 110 may be configured to drive one propeller or propulsor, in some other embodiments in a marine vessel one e-axle 100 and its corresponding electric motor 110 may be configured to drive a shaft that rotates two propellers or two propulsors, and in some other embodiments in a marine vessel one e-axle 100 and its corresponding electric motor 110 may be configured to drive a shaft that rotates one propeller or propulsor and another e-axle 100 and its corresponding electric motor 110 may be configured to drive another shaft that rotates another propeller or propulsor.

Likewise, in some embodiments in an aircraft one e-axle 100 and its corresponding electric motor 110 may be configured to drive one propeller or rotor, in some other embodiments in an aircraft one e-axle 100 and its corresponding electric motor 110 may be configured to drive a shaft that rotates two propellers or two rotors, and in some other embodiments in an aircraft one e-axle 100 and its corresponding electric motor 110 may be configured to drive a shaft that rotates one propeller or rotor and another e axle 100 and its corresponding electric motor 110 may be configured to drive another shaft that rotates another propeller or rotor.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A motor stator for a motor, comprising:
 a stator body including a weld end, a crown end, and a plurality of slots arranged circumferentially and extending axially therethrough between the weld end and the crown end, each slot of the plurality of slots including:
  a plurality of layers arranged in a radial direction with layers being organized in conductor pairs; and
  the plurality of layers to indicate a number of windings associated with each slot of the plurality of slots; and
 a plurality of windings to dispose within respective layers of respective slots of the plurality of slots, the plurality of windings including:
  a first winding including:
   a first leg to dispose within a first layer of a first slot of the plurality of slots; and
   a second leg to dispose within a first layer of a second slot of the plurality of slots; and
  a second winding including:
   a first leg to dispose within a second layer of the first slot of the plurality of slots; and
   a second leg to dispose within a first layer of a third slot of the plurality of slots;
  a distance from the first layer of the first slot of the plurality of slots to the crown end is less than a distance from the first layer of the second slot of the plurality of slots to the crown end; and
  a first number of slots of the plurality of slots located between the first slot of the plurality of slots and the second slot of the plurality of slots is less than a second number of slots of the plurality of slots located between the first slot of the plurality of slots and the third slot of the plurality of slots.

2. The motor stator of claim 1, wherein the first winding includes at least one twist chosen from (1) a twist of the first leg and the second leg in a direction different from a twist in the second winding, and (2) a twist forming a first span spanning from the first slot to a weld position different from a second span spanning from the second slot to a second weld position.

3. The motor stator of claim 1, wherein the plurality of windings include at least one jumper weld pair, and wherein the at least one jumper weld pair includes a twist of the first leg and the second leg in a direction different from a twist in the second winding.

4. The motor stator of claim 1, the first leg and the second leg joined together at a weld position, and wherein the first winding includes a twist forming a first span spanning from the first slot to the weld position that is different from a second span spanning from the second slot to the weld position.

5. The motor stator of claim 1, wherein the first winding includes a forward winding segment wound in a first circumferential direction, a reverse winding segment wound in a second circumferential direction, opposite the first circumferential direction, and a jumper weld pair connecting the forward winding segment to the reverse winding segment.

6. The motor stator of claim 5, wherein the jumper weld pair includes a twist of the first leg and the second leg in a direction different from a twist in the second winding.

7. The motor stator of claim 5, wherein the first leg and the second leg are joined together at a weld position, and wherein the jumper weld pair includes a twist forming a first span spanning from the first slot to the weld position different from a second span spanning from the second slot to the weld position.

8. An electric axle, comprising:
a motor including:
a motor rotor, and
a motor stator configured to induce rotation of the motor rotor, the motor stator including:
a stator body including a weld end, a crown end, and a plurality of slots arranged circumferentially and extending axially therethrough between the weld end and the crown end, each slot of the plurality of slots including:
a plurality of layers arranged in a radial direction with layers being organized in conductor pairs; and
the plurality of layers to indicate a number of windings associated with each slot of the plurality of slots; and
a plurality of windings, to dispose within respective layers of respective slots of the plurality of slots, the plurality of windings including:
a first winding including:
a first leg to dispose within a first layer of a first slot of the plurality of slots; and
a second leg to dispose within a first layer of a second slot of the plurality of slots; and
a second winding including:
a first leg to dispose within a second layer of the first slot of the plurality of slots; and
a second leg to dispose within a first layer of a third slot of the plurality of slots;
a distance from the first layer of the first slot of the plurality of slots to the crown end is less than a distance from the first layer of the second slot of the plurality of slots to the crown end;
a first number of slots of the plurality of slots located between the first slot of the plurality of slots and the second slot of the plurality of slots is less than a second number of slots of the plurality of slots located between the first slot of the plurality of slots and the third slot of the plurality of slots.

9. The electric axle of claim 8, wherein the first winding includes at least one twist chosen from (1) a twist of the first leg and the second leg in a direction different from a twist in the second winding, and (2) a twist forming a first span spanning from the first slot to a weld position different from a second span spanning from the second slot to a second weld position.

10. The electric axle of claim 8, wherein plurality of windings include at least one jumper weld pair, and wherein the at least one jumper weld pair includes a twist of the first leg and the second leg in a direction different from a twist in the second winding.

11. The electric axle of claim 8, the first leg and the second leg joined together at a weld position, and wherein the first winding includes a twist forming a first span spanning from the first slot to the weld position that is different from a second span spanning from the second slot to the weld position.

12. The electric axle of claim 8, wherein the first winding includes a forward winding segment wound in a first circumferential direction, a reverse winding segment wound in a second circumferential direction, opposite the first circumferential direction, and a jumper weld pair connecting the forward winding segment to the reverse winding segment.

13. The electric axle of claim 12, wherein the jumper weld pair includes a twist of the first leg and second leg in a direction different from a twist in the second winding.

14. The electric axle of claim 12, wherein the first leg and the second leg are joined together at a weld position, and wherein the jumper weld pair includes a twist forming a first span spanning from the first slot to the weld position different from a second span spanning from the second slot to the weld position.

15. A vehicle, comprising:
an electric axle including:
a motor rotor, and
a motor stator configured to induce rotation of the motor rotor, the motor stator including:
a stator body including a weld end, a crown end, and a plurality of slots arranged circumferentially and extending axially therethrough between the weld end and the crown end, each slot of the plurality of slots including:
a plurality of layers arranged in a radial direction with layers being organized in conductor pairs; and
the plurality of layers to indicate a number of windings associated with each slot of the plurality of slots; and
a plurality of windings to dispose within respective layers of respective slots of the plurality of slots, the plurality of windings including:
a first winding including:
a first leg to dispose within a first layer of a first slot of the plurality of slots; and
a second leg to dispose within a first layer of a second slot of the plurality of slots; and
a second winding including:
a first leg to dispose within a second layer of the first slot of the plurality of slots; and
a second leg to dispose within a first layer of a third slot of the plurality of slots;
a distance from the first layer of the first slot of the plurality of slots to the crown end is less than a distance from the first layer of the second slot of the plurality of slots to the crown end;

a first number of slots of the plurality of slots located between the first slot of the plurality of slots and the second slot of the plurality of slots is less than a second number of slots of the plurality of slots located between the first slot of the plurality of slots and the third slot of the plurality of slots.

16. The vehicle of claim 15, wherein the first winding includes a twist of the first leg and the second leg in a direction different from a twist in the second winding.

17. The vehicle of claim 15, wherein the plurality of windings include at least one jumper weld pair, and wherein the at least one jumper weld pair includes a twist forming a first span spanning from the first slot to a weld position different from a second span spanning from the second slot to the weld position.

18. The vehicle of claim 15, wherein the first winding includes a forward winding segment wound in a first circumferential direction, a reverse winding segment wound in a second circumferential direction, opposite the first circumferential direction, and a jumper weld pair connecting the forward winding segment to the reverse winding segment.

19. The vehicle of claim 18, wherein the jumper weld pair includes a twist of the first leg and the second leg in a direction different from a twist in the second winding.

20. The vehicle of claim 18, wherein the first leg and the second leg are joined together at a weld position, and wherein the jumper weld pair includes a twist forming a first span spanning from the first slot to the weld position different from a second span spanning from the second slot to the weld position.

* * * * *